United States Patent
Krenik et al.

(10) Patent No.: US 8,605,054 B2
(45) Date of Patent: Dec. 10, 2013

(54) TOUCH-SENSITIVE INTERFACE AND METHOD USING ORTHOGONAL SIGNALING

(75) Inventors: William R. Krenik, Garland, TX (US); Anand Dabak, Plano, TX (US)

(73) Assignee: Texas Instruments Incorporated, Dallas, TX (US)

( * ) Notice: Subject to any disclaimer, the term of this patent is extended or adjusted under 35 U.S.C. 154(b) by 544 days.

(21) Appl. No.: 12/807,333

(22) Filed: Sep. 2, 2010

(65) Prior Publication Data

US 2012/0056841 A1     Mar. 8, 2012

(51) Int. Cl.
*G06F 3/041* (2006.01)
*G06F 3/038* (2013.01)

(52) U.S. Cl.
USPC .............................. 345/174; 345/173; 345/204

(58) Field of Classification Search
USPC ...................... 345/156–184; 178/18.01–18.11
See application file for complete search history.

(56) References Cited

U.S. PATENT DOCUMENTS

| | | | |
|---|---|---|---|
| 7,663,607 B2 | 2/2010 | Hotelling et al. | 345/173 |
| 7,692,638 B2 | 4/2010 | Land et al. | 345/173 |
| 7,812,827 B2 * | 10/2010 | Hotelling et al. | 345/173 |
| 2003/0193491 A1 * | 10/2003 | Lawrence et al. | 345/204 |
| 2004/0227743 A1 * | 11/2004 | Brown | 345/204 |

OTHER PUBLICATIONS

"Fast Walsh—Hadamard transform", from Wikipedia, the free encyclopedia, 1 pages.
"Hadamard transform", from Wikipedia, the free encyclopedia, 3 pages.
"Coding and Decoding for Code Division Multiple User Communication Systems" by Timothy J. Healy, IEEE Transactions on Communications, vol. COM-33, No. 4, Apr. 1985, pp. 310-316.

* cited by examiner

*Primary Examiner* — Kent Chang
*Assistant Examiner* — Ngan Pham Lu
(74) *Attorney, Agent, or Firm* — Alan A. R. Cooper; W. James Brady, III; Frederick J. Telecky, Jr.

(57) ABSTRACT

A touch screen system includes a capacitive touch screen (1) including a plurality of row conductors (7-1,2 ... n) and a column conductor (5-1). A plurality of cotemporaneous orthogonal excitation signals ($S_1(t), S_2(t) \ldots S_n(t)$) are simultaneously driven onto the row conductors, respectively. The capacitively coupled signals on the column conductor may be influenced by a touch (10) on the capacitive touch screen. Receiver circuitry (50) includes a sense amplifier (21-1) coupled to generate an amplifier output signal ($r_1(t)$) in response to signals capacitively coupled onto the column conductor. WHT-based circuitry (35) determines amounts of signal contribution capacitively coupled by each of the excitation signals, respectively, to the amplifier output signal.

18 Claims, 9 Drawing Sheets

TOUCH-SENSITIVE INTERFACE AND METHOD USING ORTHOGONAL SIGNALING

BACKGROUND OF THE INVENTION

The present invention relates generally to capacitive touch screen sensing systems, and more particularly to providing capacitive touch screen scanning circuitry which generates substantially less noise than the prior art, provides faster scanning than the prior art, and can operate from lower supply voltage than the prior art.

Touch sensing and multi-touch sensing displays are now widely used. There are a variety of approaches to touch sensing, and capacitive touch sensing is especially advantageous because it allows use of a hard touch surface (usually glass), and provides good performance.

FIG. 1 shows a section view of a typical capacitive touch sensing screen 1, which includes a dielectric layer 2 that may be the top layer of a conventional LCD display. An optional conductive shield layer 3 may be provided on dielectric layer 2 to prevent signals in the LCD display from inducing electrical noise on column grid conductors and/or row grid conductors of capacitive touch sensing screen 1. An intermediate dielectric layer 4 is provided on shield layer 3. A number of column grid conductors 5-1, . . . n are disposed on a upper surface of dielectric layer 4. Another dielectric layer 6 is disposed on column grid conductors 5-1,2 . . . q. A number of row grid conductors 7, only one of which appears in the section view of FIG. 1, are disposed on dielectric layer 6. A top dielectric layer 8, typically composed of glass, is disposed on row conductors 7. Row conductors 7 and column conductors 5-1,2 . . . q are normally formed from indium tin oxide (ITO) or other transparent conducting materials. The dielectric layers may be composed of glass or other insulating material. The tip of a finger 9 of a user is shown on a touch point 10 on the top surface of dielectric layer 8. As the tip of finger 9 is moved across the surface of dielectric layer 8, the cross-coupling capacitance, i.e., mutual capacitance, capacitance from various row conductors 7-1,2 . . . n to various column conductors 5-1,2 . . . q changes accordingly.

The presence of a finger touch on touch point 10 changes the capacitive coupling to and between row conductors 7 and column conductors 5-1,2 . . . q. This is because finger 9 is very resistive, and therefore the capacitive coupling from a column conductor 5-1,2 . . . q up to and through finger 9 and back down to various adjacent column conductors 5-1,2 . . . q, and also to various nearby row conductors 7-1,2 . . . n varies according to how the tip of finger 9 is pressed against the surface of dielectric layer 8. The coupling capacitances are very small, typically in the femto-farad range, and it is difficult to accurately sense the very low levels of capacitance change and resulting signal change on the various row conductors and column conductors.

Prior Art FIG. 2 schematically illustrates a conventional capacitive touch screen system 15-1 including drivers 16-1,2 . . . n which receive sequential row scanning control signals on conductors 17-1,2 . . . n, respectively, and capacitively couple corresponding signals to row conductors 7-1,2 . . . n of a capacitive touch screen device 1 such as the one shown in Prior Art FIG. 1. The row drive signals on conductors 7-1,2 . . . n are capacitively coupled, i.e., cross-coupled, to column conductors 5-1,2 . . . q. The capacitively cross-coupled signals on column conductors 5-1, 2 . . . q are applied to the inverting (−) inputs of sense amplifiers 21-1,2 . . . q, respectively. Sense amplifiers 21-1,2 . . . q have feedback capacitors 25-1,2 . . . q, respectively.

Capacitively coupled touch sensing is commonly used in touch screens (such as those in "smart phones" and the like) by using detection of touch-induced changes in the capacitances associated with row conductors 7-1,2 . . . n and column conductors 5-1,2 . . . q in order to determine locations of finger touch position 10 on the touch screen.

In the example shown in Prior Art FIG. 2, row excitation or scanning signals applied to the inputs of row drivers 16-1,2 . . . n are applied in a sequential or "round robin" fashion to excite row conductors 7-1,2 . . . n. The resulting corresponding capacitively coupled signals which appear on column conductors 5-1,2 . . . q are sensed by sense amplifiers 21-1,2 . . . q. Sinusoidal burst waveforms are typically used as the round robin excitation signals to avoid generating broadband interference on the touch sensor display. With knowledge of which of row conductors 7-1,2 . . . n was excited and which of column conductors 5-1,2 . . . q indicate associated capacitive signal coupling as the round robin scanning progresses, the position of a finger press on dielectric layer 8 can be determined.

However, a substantial challenge in obtaining an accurate computation of the touch point location is achieving sufficient signal power at the sense amplifier outputs 23-1,2 . . . q to allow accurate determination of the touch point location. Another substantial challenge is achieving sufficiently fast scanning of the entire array to allow finger touch motion to be tracked and to allow new finger touch points to be accurately determined and rapidly displayed.

These challenges exist partly because the use of low-cost driver circuits limits the magnitude of the drive signals. This is problematic because the amounts of capacitive coupling are so small that a large amount of signal processing is required to extract the desired signal out of all the noise and other incursions that are normally present. The limited magnitude of the drive signals is also problematic because the touch screen must be scanned rapidly in order to track the position and/or movement of the user's finger tip (or tips) sufficiently rapidly to have the corresponding events displayed on a LCD display under layer 2 (FIG. 1) to appear to be instantaneously responsive to the user. This is especially true if there are a large number of row conductors 7-1,2 . . . q to be scanned and if a very rapid display update rate is required.

Accordingly, the duration of each of the previously mentioned sinusoidal bursts needs to be short, and the amount of required subsequent signal processing is large. For example, suppose a complete scan of the entire touch screen is required every 10 milliseconds to accurately track the finger presses such that the user perceives instantaneous tracking of finger movement. That available 10 milliseconds must be divided by the number of rows of the touch screen assembly to determine how much time is available for each segment of the round robin sequence.

The required supply voltages for the above mentioned known touch screens typically are 5 to 12 volts. Use of the required high voltage levels for row drivers 16-1,2 . . . n in Prior Art FIG. 2 limits the process technologies and circuit design techniques that can be used.

The only practical options for increasing the sensitivity of the known touch screens are to increase the voltage of the drive amplifiers and/or reduce the round robin scanning rate. Unfortunately, the most readily available appropriate integrated circuit manufacturing processes may not permit the increased voltage needed for the driver circuits. Furthermore, fast touch screen response is required by the market in many applications. Consequently, it would be highly desirable to have a way of increasing the sensitivity and display update rate of a touch screen to a finger touch without relying on the above mentioned options.

The state-of-the-art is generally indicated in U.S. Pat. No. 7,663,607 entitled "Multipoint Touchscreen" issued Feb. 16, 2010 and U.S. Pat. No. 7,692,638 entitled "Error Compensation for Multi-Touch Surfaces", issued Apr. 6, 2010.

When higher signal voltage and signal power levels are required in touch screen integrated circuitry to achieve the desired touch screen performance, more costly, higher voltage integrated circuit fabrication processes are required. It therefore becomes more difficult to integrate such circuitry with lower voltage, higher density, and lower cost circuitry that is ordinarily utilized for fabricating state-of-the-art integrated circuit touch screen control circuitry.

Known CDMA (code division multiple access) techniques in wireless systems involve use of orthogonal signals for transmitting between multiple base stations and handsets within a cell of wireless systems. Such conventional CDMA techniques involve transmitting multiple signals in a single channel and attempting to separate the information content in the individual channels while trying to keep the multiple signals separate in the single channel.

There is an unmet need for a capacitively coupled touch screen system having increased touch sensitivity without requiring increased supply voltage levels and without requiring use of a reduced "round robin" scanning rate.

There also is an unmet need for a capacitively coupled touch screen system which has fundamentally higher SNR (signal to noise ratio), faster touch screen response, and the ability to operate at lower power/voltage levels than the closest prior art capacitively coupled touch screen systems.

There also is an unmet need for a capacitively coupled touch screen system which allows "lower-voltage", less costly semiconductor wafer fabrication processes to be utilized in the manufacture of faster, more accurate capacitively coupled touch screen systems.

There also is an unmet need for a capacitively coupled touch screen system which allows more accurate determination of all of the cross-coupling coefficients between grid conductors of the capacitive sensing touch screen.

SUMMARY OF THE INVENTION

It is an object of the invention to provide a capacitively coupled touch screen system having increased touch sensitivity without requiring increased supply voltage levels and without requiring use of a reduced "round robin" scanning rate.

It is another object of the invention to provide a capacitively coupled touch screen system which has fundamentally higher SNR (signal to noise ratio), faster touch screen response, and the ability to operate at lower power/voltage levels than the closest prior art capacitively coupled touch screen systems.

It is another object of the invention to provide a capacitively coupled touch screen system which allows "lower-voltage", less costly semiconductor wafer fabrication processes to be utilized in the manufacture of faster, more accurate capacitively coupled touch screen systems.

It is another object of the invention to provide a capacitively coupled touch screen system which allows more accurate determination of all of the cross-coupling coefficients between grid conductors of the capacitive sensing touch screen.

Briefly described, and in accordance with one embodiment, the present invention provides a touch screen system including a capacitive touch screen (1) having a plurality of row conductors (7-1,2 . . . n) and a column conductor (5-1). A plurality of cotemporaneous orthogonal excitation signals $(S_1(t), S_2(t) \ldots S_n(t))$ are simultaneously driven onto the row conductors, respectively. The capacitively coupled signals on the column conductor may be influenced by a touch (10) on the capacitive touch screen. Receiver circuitry (50) includes a sense amplifier (21-1) coupled to generate an amplifier output signal $(r_1(t))$ in response to signals capacitively coupled onto the column conductor. WHT-based circuitry (35) determines amounts of signal contribution capacitively coupled by each of the excitation signals, respectively, to the amplifier output signal.

In one embodiment, the invention provides a touch screen system (11-1,2) including a capacitive touch screen (1) having a plurality of row conductors (7-1,2 . . . n) and a column conductor (5-1). Orthogonal drive circuitry (12) is coupled to simultaneously drive a plurality of cotemporaneous orthogonal excitation signals $(S_1(t), S_2(t) \ldots S_n(t))$ onto the row conductors (7-1,2 . . . n). The cotemporaneous orthogonal excitation signals $(S_1(t), S_2(t) \ldots S_n(t))$ occur over a plurality of successive time intervals (T1,T2 . . . Tn) each having a predetermined duration (T). Receiver circuitry (50) includes a sense amplifier (21-1) coupled to generate an amplifier output signal $(r_1(t))$ in response to signals capacitively coupled onto the column conductor (5-1) in response to the cotemporaneous orthogonal excitation signals $(S_1(t), S_2(t) \ldots S_n(t))$ on the row conductors (7-1,2 . . . n), wherein one or more of the capacitively coupled signals on the column conductor (5-1) may be influenced by a touch (10) on the capacitive touch screen (1). Logic circuitry (35,35A) determines amounts of contribution of the cotemporaneous excitation signals $(S_1(t), S_2(t) \ldots S_n(t))$ to the amplifier output signal $(r_1(t))$ due to capacitive coupling from each from each row conductor (7-1,2 . . . n), respectively, to the column conductor (5-1).

In a described embodiment, each of the cotemporaneous orthogonal excitation signals $(S_1(t), S_2(t) \ldots S_n(t))$ is generated by multiplying a plurality of segments (T1,T2 . . . Tn) of a carrier signal by a plurality of elements, respectively, of a corresponding Walsh-Hadamard sequence. In a described embodiment, the carrier signal is sinusoidal.

In a described embodiment, the capacitive touchscreen (1) includes a plurality of the column conductors (5-1,2 . . . q) and a plurality of the sense amplifiers (21-1,2 . . . q) each coupled to generate a corresponding amplifier output signal $(r_1(t), r_2(t) \ldots r_q(t))$ in response to signals capacitively coupled onto the plurality of column conductors (5-1,2 . . . q) in response to the cotemporaneous orthogonal excitation signals $(S_1(t), S_2(t) \ldots S_n(t))$ on the row conductors (7-1,2 . . . n), wherein one or more of the capacitively coupled signals on the plurality of column conductors (5-1,2 . . . q) may be influenced by the touch (10) on the capacitive touch screen (1).

In a described embodiment, the receiver circuitry (50) includes a plurality of multiplier circuits (32-1,2 . . . q) for correlating the amplifier output signals $(r_1(t), r_2(t) \ldots r_q(t))$ by multiplying them by cotemporaneous orthogonal correlation signals (S(t)), a plurality of summation circuits (37-1,2 . . . q) for accumulating correlated signal information from the multiplier circuits (32-1,2 . . . q), respectively, over time intervals equal to the predetermined duration (T), and a plurality of sampling circuits (44-1,2 . . . q) for sampling outputs of the summation circuits (37-1,2 . . . q), respectively, at ends of the time intervals (T1,T2 . . . Tn), and the logic circuitry (35,35A) determines amounts of signal contribution of the cotemporaneous excitation signals $(S_1(t), S_2(t) \ldots S_n(t))$ capacitively coupled from each row conductor (7-1,2 . . . n), respectively, to each of the plurality of column conductors (5-1,2 . . . q). Each of the amplifier output signals ($r_1(t)$, $r_2(t)$ . . . $r_q(t)$) is multiplied by a first cotemporaneous orthogonal correlation signal (S(t)) and then is input to a corresponding first summation circuit (37-1,2 . . . q) and is also multiplied by a second cotemporaneous orthogonal correlation signal ($S^{90°}(t)$) and then is input to a corresponding second summation circuit (37-1A,2A . . . qA), wherein the second cotemporaneous orthogonal correlation signal ($S^{90°}(t)$) is the same as but shifted in phase relative to the first cotemporaneous orthogonal correlation signal (S(t)). In a described embodiment of the invention, the second cotemporaneous orthogonal correlation signal ($S^{90°}(t)$) is shifted 90° in phase relative to the first cotemporaneous orthogonal correlation signal (S(t)).

In a described embodiment, the receiver circuitry (50) includes a plurality of analog to digital converters (ADCs) (31-1,2 . . . q) coupled between the sense amplifiers (21-1,2 . . . q) and the multiplier circuits (32-1,2 . . . q) for converting the amplifier output signals ($r_1(t)$,$r_2(t)$ . . . $r_q(t)$) to digital representations thereof.

In a described embodiment, the plurality of sampling circuits include a plurality of switches (44-1,2 . . . q), respectively, coupled between outputs of the summation circuits (37-1,2 . . . q) and inputs of the logic circuitry (35). Each of the plurality of switches (44-1,2 . . . q) is controlled to generate information samples ($x_i^1$, $x_i^2$, . . . $x_i^n$) sampled at the ends of the time intervals ((T1,T2 . . . Tn).

In a described embodiment, the logic circuitry includes Walsh-Hadamard Transform based logic circuitry (35) which executes an inverse Walsh-Hadamard Transform on the information samples ($x_i^1$, $x_i^2$, . . . $x_i^n$) sampled at the ends of the time intervals ((T1,T2 . . . Tn) to generate a coupling coefficient matrix (Matrix 1). The coupling coefficient matrix (Matrix 1) represents the equations $$r_i(t) = \sum_{j=1}^{N} \alpha^{ij} S_j(t); i = 1, 2, \ldots q,$$

where $\alpha^{ij}$ denote the cross-coupling coefficients from the row j to the column i, $S_j(t)$ represents the cotemporaneous orthogonal excitation signals on the row j, $r_i(t)$ represents the amplifier output signal for the column i, and N represents a number of rows. In a described embodiment, the inverse Walsh-Hadamard Transform corresponding to a column i with respect to a sequence of the samples ($x_i^1$, $x_i^2$, . . . $x_i^n$) included in a Walch Hadamard code corresponding to a row j is given by the expression $$\sum_{l=1}^{L} c_j^l x_i^l; j = 1, 2, \ldots, N,$$

wherein $c_j^1$ is an element of Walsh-Hadamard code ($c_j^1$, $c_j^2$, . . . , $c_j^L$) for the row j, and L is the length of the Walsh-Hadamard code (Anand, is this correct?), and wherein the coupling coefficient matrix (Matrix 1) is represented by $$\begin{vmatrix} \alpha^{i1} & \alpha^{i2} & \alpha^{i(N-1)} & \alpha^{iN} \\ \alpha^{21} & \alpha^{22} & \alpha^{2(N-1)} & \alpha^{2N} \\ & & & \\ \alpha^{q1} & & & \alpha^{qn} \end{vmatrix}.$$

In one embodiment of the invention, the cotemporaneous orthogonal excitation signals $S_1(t)$, $S_2(t)$ . . . $S_q(t)$ are wavelets. In another embodiment, each of the cotemporaneous orthogonal excitation signals $S_1(t)$, $S_2(t)$ . . . $S_q(t)$ is multiplied by a common randomized spreading code to avoid radio frequency interference. In another embodiment, each of the cotemporaneous orthogonal excitation signals ($S_1(t)$, $S_2(t)$ . . . $S_q(t)$) includes a relatively short dead time (46) at the end of each of the segments (T) to allow effects of excitation signal dispersion to settle.

In one embodiment, the invention provides a method for operating a touch screen system (11-1,2) including a capacitive touch screen (1) including a plurality of row conductors (7-1,2 . . . n) and a column conductor (5-1), and receiver circuitry (50) including a sense amplifier (21-1,2 . . . q) coupled to generate an amplifier output signal ($r_1(t)$) in response to signals capacitively coupled onto the column conductor (5-1), wherein the method includes simultaneously driving a plurality of cotemporaneous orthogonal excitation signals ($S_1(t)$, $S_2(t)$ . . . $S_n(t)$) onto the row conductors (7-1,2 . . . n), respectively, wherein one or more of the capacitively coupled signals on the column conductor (5-1) may be influenced by a touch (10) on the capacitive touch screen (1), and wherein the cotemporaneous orthogonal excitation signals ($S_1(t)$, $S_2(t)$ . . . $S_n(t)$) occur over a common plurality of successive time intervals (T1,T2 . . . Tn), each of the time intervals (T1,T2 . . . Tn) having a predetermined duration (T); and determining amounts of contribution by each of the cotemporaneous excitation signals ($S_1(t)$, $S_2(t)$ . . . $S_n(t)$) to the amplifier output signal ($r_1(t)$) due to capacitive coupling from each row conductor (7-1,2 . . . n), respectively, to the column conductor (5-1).

In one embodiment of the invention, each of the cotemporaneous orthogonal excitation signals ($S_1(t)$, $S_2(t)$ . . . $S_n(t)$) is generated by multiplying a plurality of segments (T1,T2 . . . Tn) of a carrier signal by a plurality of elements, respectively, of a corresponding Walsh-Hadamard sequence, and the receiver circuitry (50) includes a plurality of the column conductors (5-1,2 . . . q) and a plurality of the sense amplifiers each coupled to generate a corresponding amplifier output signal ($r_1(t)$, $r_2(t)$ . . . $r_q(t)$) in response to signals capacitively coupled onto the plurality of column conductors (5-1,2 . . . q), respectively, in response to the cotemporaneous orthogonal excitation signals ($S_1(t)$, $S_2(t)$ . . . $S_n(t)$), wherein the method includes correlating the amplifier output signals ($r_1(t)$, $r_2(t)$ . . . $r_q(t)$) by multiplying them by a first cotemporaneous orthogonal correlation signal (S(t)), accumulating the correlated amplifier output signals, respectively, over a time interval equal to the predetermined duration (T), and sampling the correlated and then accumulated amplifier output signals at the ends of the time intervals (T1,T2 . . . Tn). In one embodiment, the method includes executing an inverse Walsh-Hadamard Transform on information samples ($x_i^1$, $x_i^2$, . . . $x_i^n$) of the correlated and accumulated and then sampled amplifier output signals to generate information representative of a coupling coefficient matrix (Matrix 1). In one embodiment, the correlating includes also multiplying the amplifier output signals ($r_1(t)$, $r_2(t)$ . . . $r_q(t)$) by a second cotemporaneous correlation signal ($S^{90°}(t)$), wherein the second cotemporaneous orthogonal correlation signal ($S^{90°}(t)$) is the same as but shifted in phase relative to the first cotemporaneous orthogonal correlation signal ($S(t)$). The carrier signal may be sinusoidal.

In one embodiment, the invention provides a touch screen system (11-1,2) including a capacitive touch screen (1) having a plurality of row conductors (7-1,2 ... n) and a column conductor (5-1) and receiver circuitry (50) including a sense amplifier (21-1,2 ... q) coupled to generate an amplifier output signal ($r_1(t)$) in response to signals capacitively coupled onto the column conductor (5-1), means (12,18) for simultaneously driving a plurality of cotemporaneous orthogonal excitation signals ($S_1(t), S_2(t) ... S_n(t)$) onto the row conductors (7-1,2 ... n), respectively, wherein one or more of the capacitively coupled signals on the column conductor (5-1) may be influenced by a touch (10) on the capacitive touch screen (1), and wherein the cotemporaneous orthogonal excitation signals ($S_1(t), S_2(t) ... S_n(t)$) occur over a common plurality of successive time intervals (T1,T2 ... Tn), each of the time intervals (T1,T2 ... Tn) having a predetermined duration (T), and means (35,35A) for determining amounts of contribution by each of the cotemporaneous excitation signals ($S_1(t), S_2(t) ... S_n(t)$) to the amplifier output signal ($r_1(t)$) due to capacitive coupling from each row conductor (7-1,2 ... n), respectively, to the column conductor (5-1,2 ... q).

DETAILED DESCRIPTION OF THE PREFERRED EMBODIMENTS

The present invention overcomes the above mentioned problems of the prior art by using orthogonal signals to excite a touch screen and to sense the resulting capacitively coupled signals generated on various grid conductors of the touch screen. All (or a substantial part) of the entire touch screen display can be excited simultaneously by the orthogonal excitation signals. The orthogonal excitation signals can be applied to touch screen grid conductors (such as row conductors 7-1,2 ... n and column conductors 5-1,2 ... q in FIG. 1) for much longer time intervals than would be possible using the previously mentioned round robin row and column scanning techniques. This allows signal energy levels to be increased without increasing supply voltage levels. Since a certain amount of signal energy is needed to overcome noise signals that may be present, such increased signal energy levels allow more accurate touch estimates to be achieved at lower signal power levels than is possible in the prior art.

By way of definition, two cotemporaneous signals (i.e., two signals that are simultaneously active) are considered to be orthogonal over a time interval T if the integral of their product over that time interval is equal to zero. Examples of orthogonal signals include sine signals and cosine signals. This is in contrast to prior art capacitively coupled touch sensor systems in which the previously mentioned time-sequenced or round robin excitation signals are active only during short excitation signal bursts sequentially applied to each touch screen grid conductor. Also by way of definition, the terms "row conductor" and "column conductor" as used herein are not intended to be limited to horizontal, straight row conductors and vertical, straight column conductors. For example, the term "row conductor" is intended to encompass wavy non-horizontal conductors that intersect "column conductors" which may be wavy and non-vertical.

As subsequently explained, the use of the orthogonal excitation signals in accordance with the present invention also allows touch-influenced, capacitively coupled touch signals on particular scanned touch screen grid conductors to be effectively "separated" in the receiver circuitry without using the previously mentioned sequential "round robin" excitation signal techniques. The foregoing receiver circuitry may include sense amplifiers, ADCs, multiplexers, integrators, switches, and driver code multiplexing (DCM) logic. (Driver code multiplexing or DCM is somewhat similar to the CDMA (previously mentioned), but different in that driver code multiplexing (DCM) involves application of code multiplexing techniques for touch sense applications while CDMA is used for wireless systems.

Figure 1:
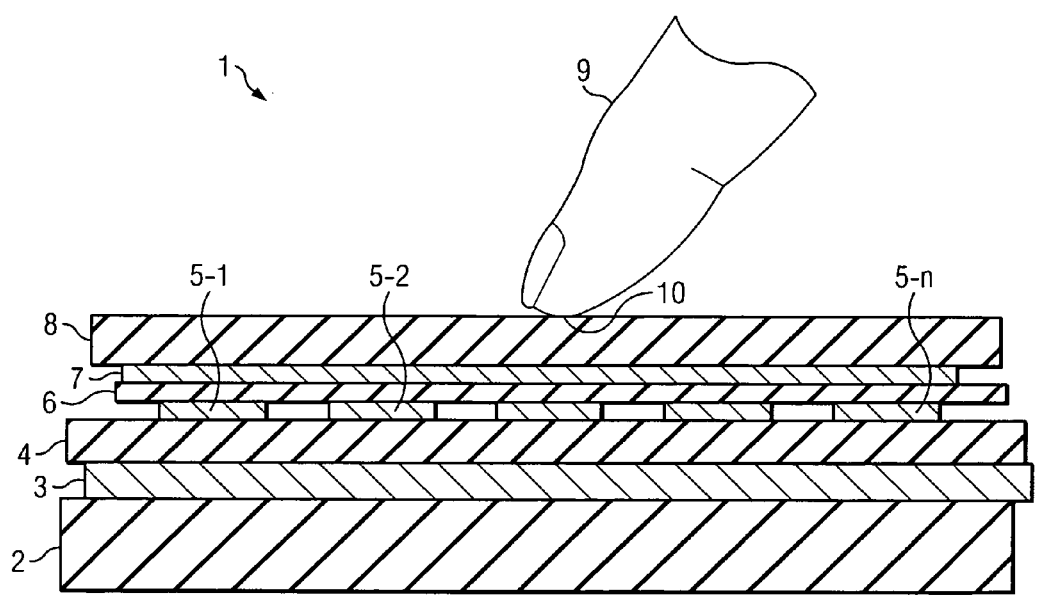
FIG. 1 is a section view of a conventional touch screen device.
Figure 3:
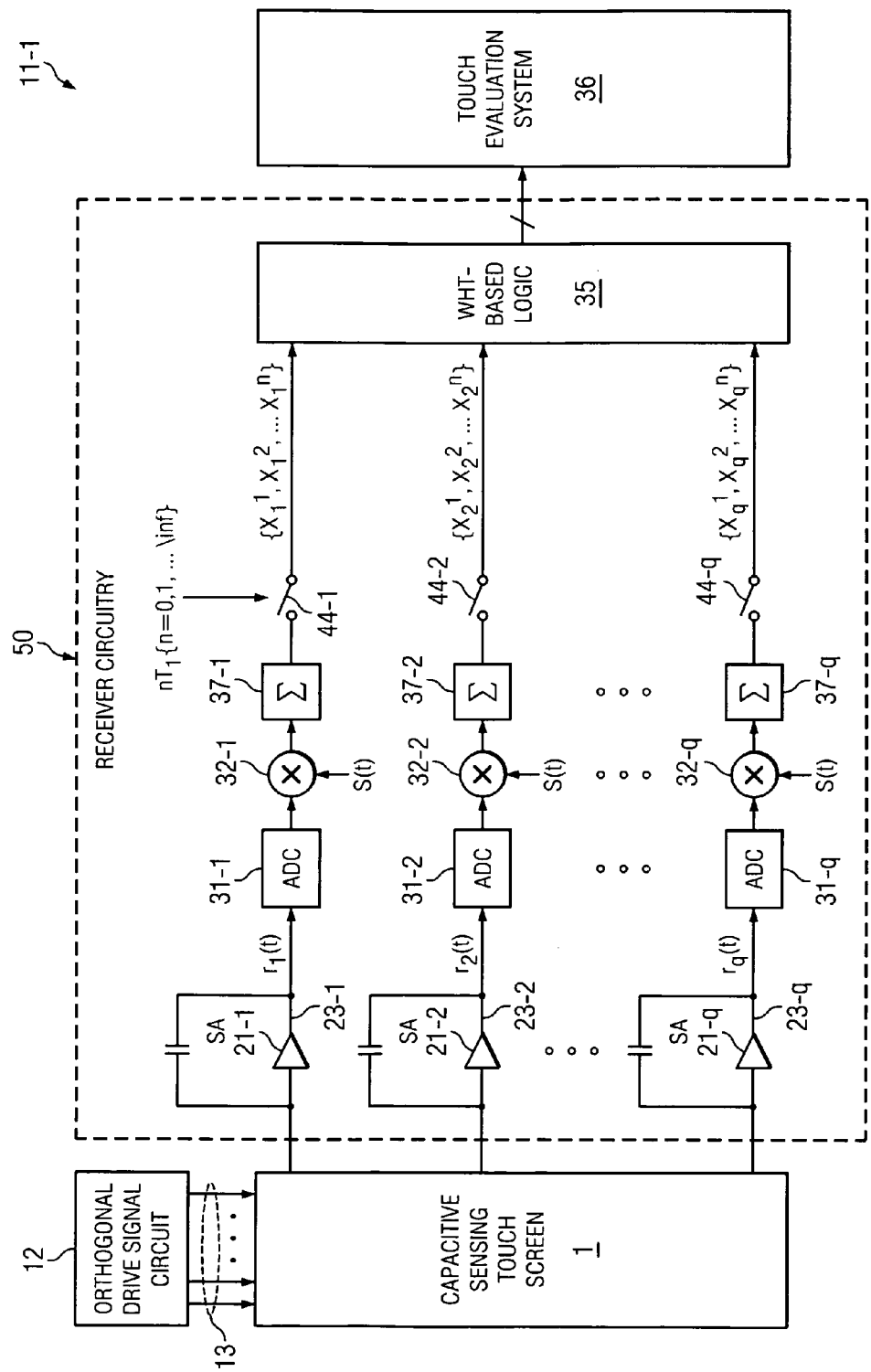
FIG. 3 is a schematic diagram of a generalized capacitively coupled touch screen system of the present invention.

FIG. 3 shows a touch screen system 11-1 in which a capacitive sensing touch screen 1, such as the one shown in Prior Art FIG. 1, is driven by orthogonal excitation signal components generated on drive conductors 13 of touch screen 1 by an orthogonal drive signal circuit 12. In this example, the orthogonal drive signals are simultaneously and continuously applied to all (or at least a group) of the touch screen grid conductors so as to generate touch screen output signals that are applied to the inputs of corresponding sense amplifiers 21-1,2 ... q. Receiver circuitry 50 includes sense amplifiers 21-1,2 ... q and also includes ADCs 31-1,2 ... q, multiplexers 32-1,2 ... q, integrators 37-1,2 ... q, switches 44-1,2 ... q, and DCM logic which is referred to herein as "WHT-based logic" 35 because it is based on the subsequently described Walsh-Hadamard transform (WHT). The scanning of touch screen 1 results in output signals $r_1(t), r_2(t) ... r_q(t)$ being generated on sense amplifier output conductors 23-1,2 ... q, respectively. Note that excitation signals can be driven onto all (or at least a group) of the rows (or columns) simultaneously.

Figures 1, 4:
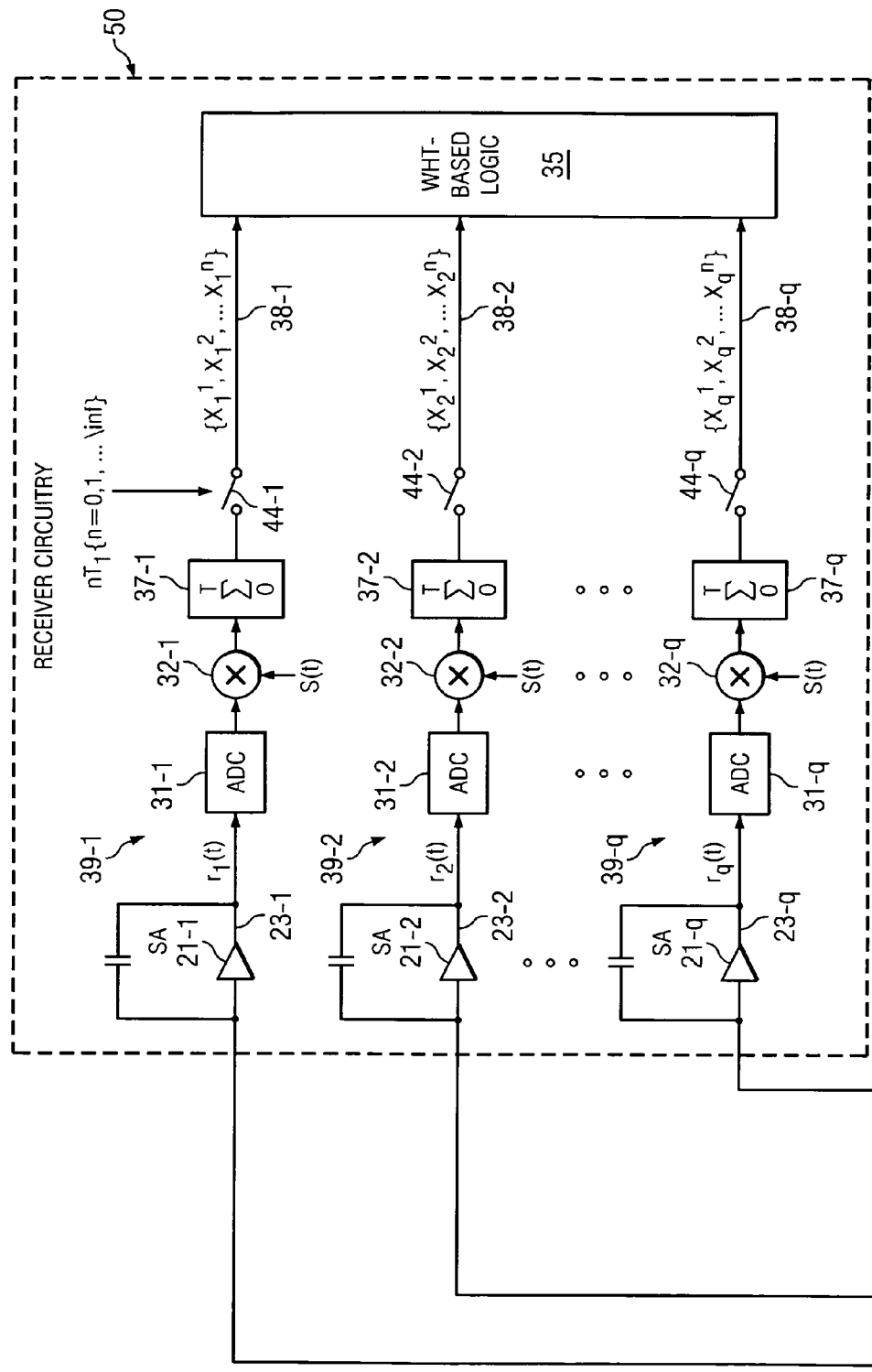
FIG. 4 is a schematic diagram of another capacitively coupled touch screen system of the present invention.
Figures 2, 4:
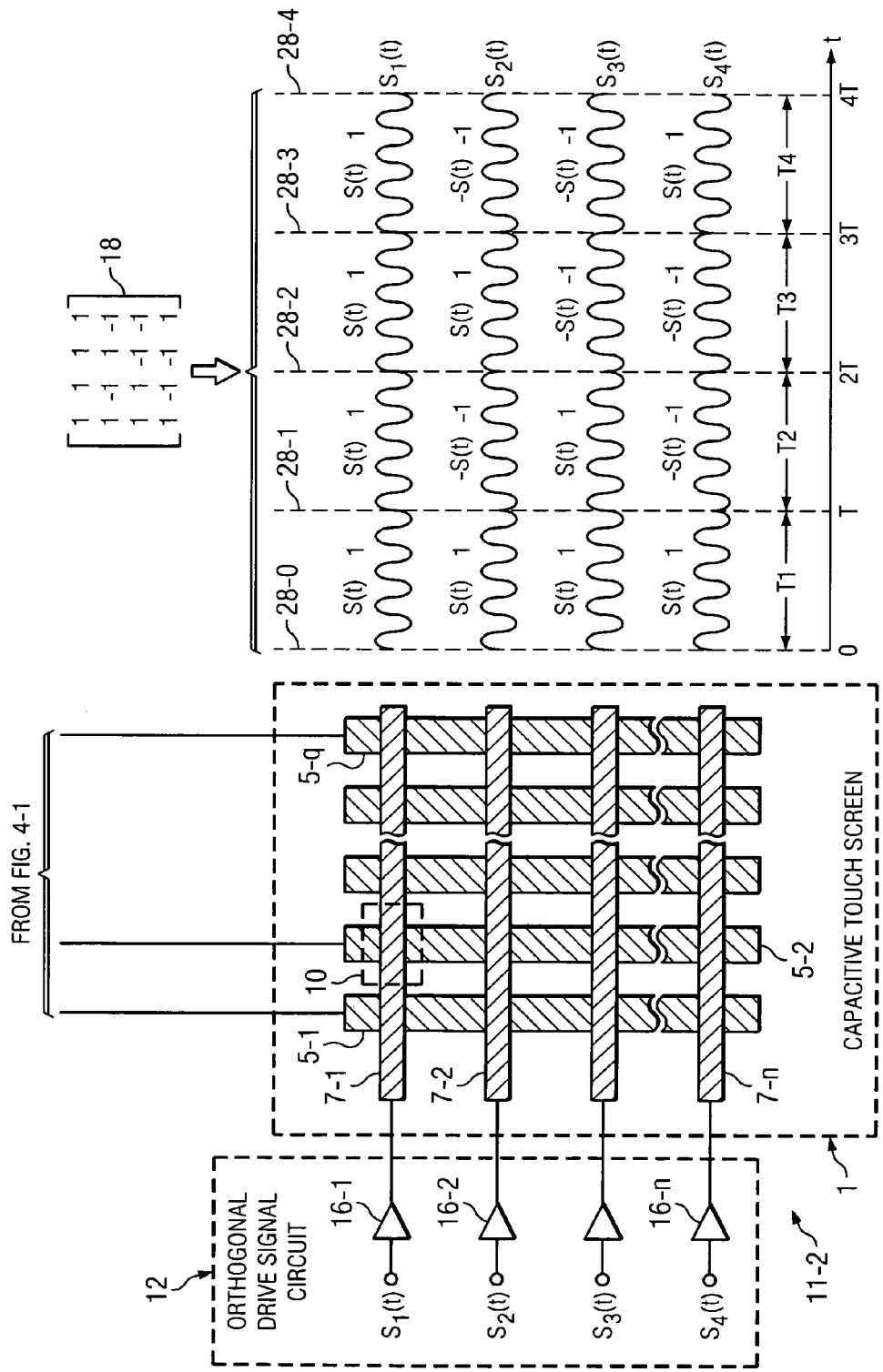

It should be understood, however, that some embodiments of the invention may include only a single column conductor (such as any one of column conductors 5-1,2 ... q), in which case there would be only a single corresponding branch such as branch 39-1 (e.g., including only a single sense amplifier, a single ADC, a single multiplier, a single accumulator, and a single sampling switch) in FIG. 4.

The various touch-influenced, capacitively coupled signals then can be separated at the outputs of each of the sense amplifier outputs by means of correlators which can be implemented with conventional multipliers 32-1,2 ... q so that the amount of touch-influenced signal coupling from each row to each column and from each row to nearby rows (or from each column to nearby columns) can be determined. In this example, the above mentioned sense amplifier output signals $r_1(t), r_2(t) \ldots r_q(t)$ are digitized by ADCs (analog to digital converters) 31-1,2 ... q, respectively. The digital output signals generated by ADCs 31-1,2 ... q are multiplied by orthogonal S(t) signals by means of digital multipliers 32-1,2 ... q, respectively. The orthogonal S(t) signals are subsequently described in more detail.)

The outputs of multipliers 32-1,2 ... q are summed or integrated over a single integrating time period T. The outputs of summation circuits 37-1,2 ... q are applied to one terminal of each of switches 44-1,2 ... q, respectively. Another terminal of each of switches 44-1,2 ... q is connected to a corresponding input, respectively, of WHT-based logic 35. The control terminals of switches 44-1,2 ... q are controlled by signals represented by the expression nT, {n=0, 1, ... \inf}, respectively, where T is a time interval and the term "\inf" indicates that the driver signals and receiver signals are occurring essentially continuously.)

Figure 2:
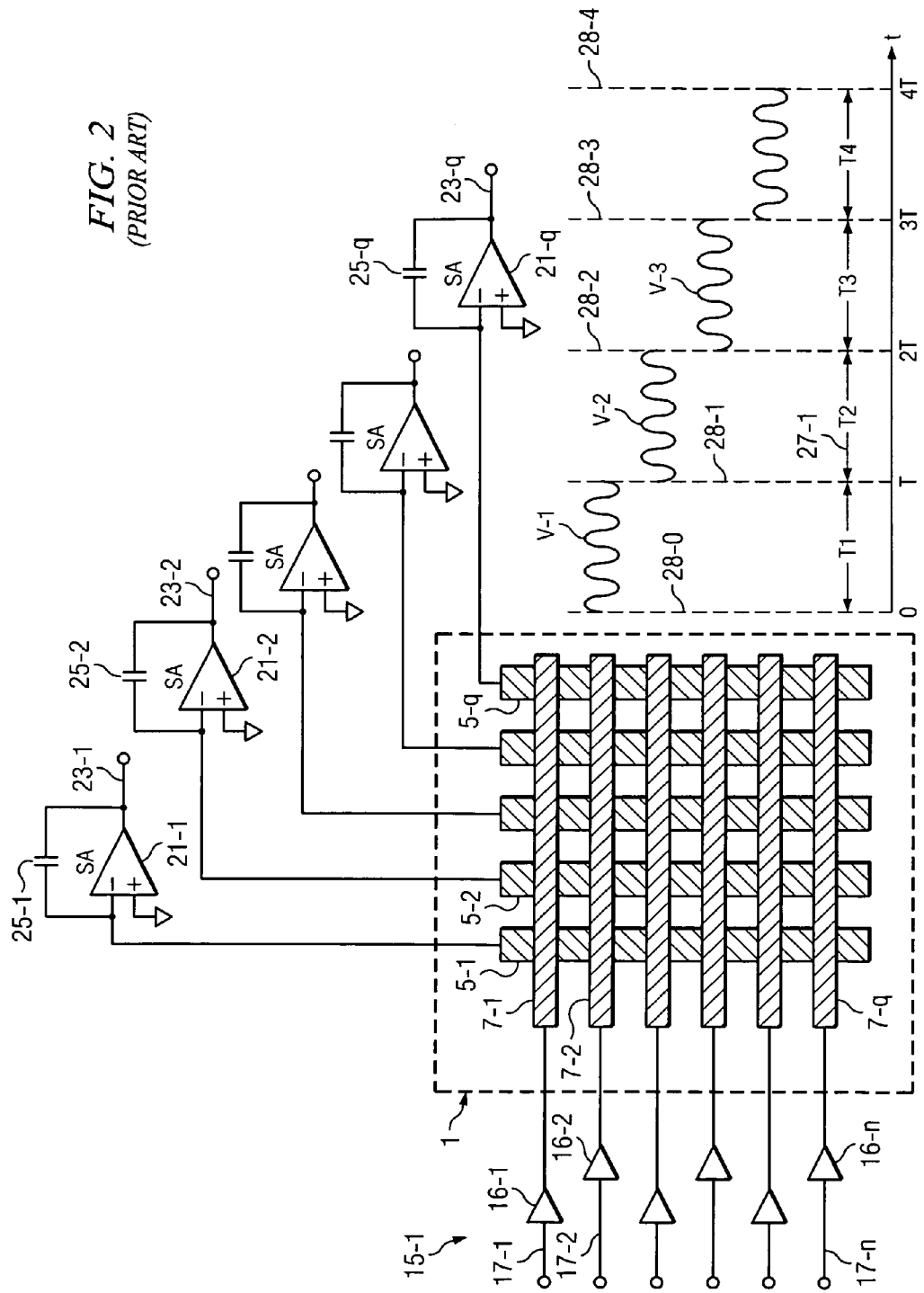
FIG. 2 is a schematic diagram of a conventional system for driving and sensing row and column conductors of a conventional touch screen which utilizes capacitive coupling between the row and column conductors to determine finger touch location.

The outputs of switches 44-1,2 ... q are connected to inputs of WHT-based logic 35. WHT-based logic 35 performs the functions of separating out all the individual touch-influenced signals capacitively cross-coupled from the driven row conductors 7-1,2 ... n to the column conductors 5-1,2 ... q (e.g., as in FIG. 2). The resulting information generated on digital bus 35A represents the continuously digitized, correlated and accumulated sense amplifier outputs signals $r_1(t), r_2(t) \ldots r_q(t)$. Touch evaluation system 36 then receives the information produced on digital bus 35A by WHT-based logic 35 and precisely determines the values of the various cross-coupling coefficients and uses them to determine the coordinates of the continuously digitized, correlated and accumulated sense amplifier output signals $r_1(t), r_2(t) \ldots r_q(t)$.

If touch-influenced capacitive coupling into an adjacent or nearby row conductor or column conductor occurs, the corresponding sense amplifier output signals $r_1(t), r_2(t) \ldots r_q(t)$ can be separated out by means of WHT-based logic 35. WHT-based logic 35 determines exactly what sequence of orthogonal non-inverted or inverted sinusoidal bursts was transmitted (e.g., in accordance with a Walsh Hadamard code or sequence such as 1111 or 1-1-11, etc., during the time intervals T1, T2, T3, ..., respectively, as indicated in subsequently described FIG. 4). WHT-based logic 35 can separate out a signal received from any of the column signals on column conductors 5-1,2 ... q (e.g., as in FIG. 2), and then it can be determined what percentage of the column signal was due to the influence of a finger touch 10 proximate to a particular row conductor 7-1,2 ... n and column conductor 5-1,2 ... q. Based on that information, an accurate determination of the location of a finger touch can be computed.

The somewhat generalized embodiment of the invention shown in FIG. 3 can utilize carrier waveforms that are modulated in time by an orthogonal function to provide the above mentioned orthogonal row and column scanning signals. The subsequently described Walsh-Hadamard Transform (WHT) provides a relatively simple technique for generating orthogonal sinusoidal bursts. As an example, the subsequently described Walsh-Hadamard Transform is used to produce orthogonal signals by modulating a fixed frequency sinusoidal carrier signal to generate orthogonal sinusoidal signal bursts. This technique allows the integration and capture time in the receiver function (i.e., in the summation circuits 37-1,2 ... q and WHT-based logic 35) to be extended and reduces the effect of noise, ISI (inter-signal interference), and other kinds of interference. Advantageously, this is accomplished without significantly increasing system bandwidth.

In accordance with the present invention, smaller-amplitude capacitively coupled signals are received for longer periods of time by the sense amplifiers, digitized by the ADCs, correlated by means of the multipliers along with the orthogonal signals S(t) input to the multipliers, integrated by the summation/integrator circuits, and captured and processed by WHT-based logic 35 over substantially longer amounts of time of time than would be available if round robin scanning sequences were to be utilized as in the prior art technology.

As subsequently explained, the simultaneous and continuous driving of all of the multiple driver circuits (not shown) in orthogonal drive signal circuit 12 of FIG. 3 by means of orthogonal signals (instead of round robin sequence signals) provides improved sensitivity (for comparable excitation signal voltage levels) on grid conductors (not shown in FIG. 3) in capacitive sensing touch screen 1, and also allows effective separation of the touch-influenced capacitively coupled signals generated by the various driver circuits on the sense amplifier outputs $r_1, r_2(t) \ldots r_q(t)$. The improved sensitivity allows more accurate calculation of all cross-coupling coefficients between grid conductors of capacitive sensing touch screen 1.

FIG. 4 illustrates a touch screen system 11-2 in which the well-known Walsh-Hadamard transform is utilized to generate the above mentioned orthogonal excitation signals. In FIG. 4, touch screen system 11-2 includes capacitive sensing touch screen 1 (which can be the same as in FIG. 3). Capacitive touch screen 1 includes a number of column grid conductors 5-1,2 ... q and a number of row grid conductors 7-1,2 ... n, generally as indicated in Prior Art FIGS. 1 and 2. Row conductors 7-1,2 ... n are driven by the outputs of a number of driver circuits 16-1,2 ... n. The inputs of driver circuits 16-1,2 ... n are simultaneously driven by orthogonal excitation signals $S_1(t), S_2(t) \ldots S_n(t)$, respectively. Example waveforms of orthogonal excitation signals $S_1(t), S_2(t) \ldots S_n(t)$, for the simplified case wherein n=4, are shown in the timing diagram that also is included in FIG. 4.

The Walsh-Hadamard transform is utilized to modulate a steady sinusoidal carrier signal to generate the orthogonal excitation signals $S_1(t), S_2(t) \ldots S_n(t)$ applied to the inputs of drivers 16-1,2 ... n. Matrix 18 in FIG. 4 contains Walsh-Hadamard codes 1111, 1-11-1 etc., generated by the previously mentioned Walch-Hadamard transform, and is referred to herein as "Walsh-Hadamard code matrix 18" or simply as the "WHT code matrix 18". Relatively small portions of the orthogonal signals applied by drivers 16-1,2 ... n to each of row conductors 7-1,2 ... n are capacitively coupled onto each of column conductors 5-1,2 ... q (and also onto various nearby or adjacent row conductors) and applied to the inputs of sense amplifiers 21-1,2 ... q.

The elements {1111} of the first row of WHT code matrix 18 in FIG. 4 constitute a "WHT code" or "WHT sequence" corresponding to excitation signal $S_1(t)$ in the present example wherein n=4. The WHT code {1111} results in the steady sinusoidal signal segment S(t) being multiplied by 1 during each of the q=4 time intervals T1, T2, T3, and T4, respectively, to generate excitation signal $S_1(t)$ applied to the input of driver 16-1. Similarly, the WHT code {1-11-1} contained in the second row of WHT code matrix 18 results in the above mentioned steady sinusoidal signal S(t) being multiplied by 1, −1, 1, and −1 during each of T1, T2, T3, and T4, respectively, to generate the orthogonal excitation signal $S_2(t)$ applied to the input of driver 16-2, and so forth. Simple inversion (rather than more complex phase shifting) of the sinusoidal drive signal in various time intervals T accomplishes the orthogonal modulation imposed by the WHT codes of WHT code matrix 18.

More specifically, excitation signal $S_1(t)$ is equal to a sinusoidal carrier signal S(t) during each of time intervals T1, T2, T3, and T4 as shown in the timing diagram in FIG. 4 and also as indicated by the "1"s, which correspond to S(t), located above the segments of the sinusoidal waveform in each of time intervals T1, T2, T3, and T4. That is, $S_1(t)$ is equal to S(t) in each of time intervals T1, T2, T3 and T4. Similarly, the $S_2(t)$ waveform is equal to S(t) during time intervals T1 and T3 as indicated by the "1"s above the portions of the $S_2(t)$ waveform in each of time intervals T2 and T4 and is also equal to −S(t) during time intervals T2 and T4, as indicated by the "−1"s, which correspond to −S(t), located above the portions of the $S_2(t)$ waveform that occur during T2 and T4. Similarly, the $S_3(t)$ waveform is equal to S(t) during time intervals T1 and T2 and is equal to −S(t) during time intervals T3 and T4, and the $S_4(t)$ waveform is equal to S(t) during time intervals T1 and T4 and is equal to −S(t) during time intervals T2 and T3.

Each value of S(t) in FIG. 4 represents a one-time event or segment, either S(t) if the subsequently described corresponding WHT code matrix element is "1" or −S(t) if the corresponding WHT code matrix element is "−1". Thus, each S(t) segment shown in the timing diagram of FIG. 4 is either a sine wave or an inverted sine wave. WHT code matrix 18 can be thought of as "riding on" S(t) and multiplying it by 1 or −1 during each time interval T by the corresponding element of the corresponding WHT code in WHT code matrix 18, respectively.

Column conductors 5-1,2 . . . q are connected to the inputs of sense amplifiers 21-1,2 . . . q. One or more finger touches 10 present on capacitive sensing touch screen 1 influence the capacitive cross-couplings between various row conductors 7-1,2 . . . n and various column conductors 5-1,2 . . . q which are sufficiently proximate to the finger touch (or touches) 10 to cause corresponding signal variations to appear at the inputs of the corresponding sense amplifiers 21-1,2 . . . q. This causes sense amplifiers 21-1,2 . . . q to generate output signals $r_1(t)$, $r_2(t)$ . . . $r_q(t)$. Sense amplifier output signals $r_1(t)$, $r_2(t)$ . . . $r_q(t)$ appear as substantially attenuated replicas of orthogonal excitation signals $S_1(t), S_2(t) \ldots S_n(t)$ and are not orthogonal.

The signals $r_i(t)$ as a function of the signals $S_1(t), S_2(t), \ldots, S_n(t)$ are given by $$r_i(t) = \sum_{j=1}^{N} \alpha^{ij} S_j(t); \, i = 1, 2, \ldots q,$$

Equation 1 where $\alpha^{ij}$ denote the cross-coupling coefficients from the row j to the column i. For example, $r_1(t)$ is equal to a summation of $S_1(t), S_2(t) \ldots S_n(t)$ times various coupling coefficients, respectively, that are to be determined. Sense amplifier outputs $r_1(t), r_2(t) \ldots r_q(t)$ are not be orthogonal, because they are a mixture of superimposed capacitively coupled signal components which are not capable of being integrated to a value of 0 over a time interval T.

Receiver circuitry 50, including sense amplifiers 21-1,2 . . . q, ADCs 31-1,2 . . . q, multipliers 32-1,2 . . . q, summation circuits 37-1,2 . . . q, switches 44-1,2 . . . q, and WHT-based logic 35, may be as in previously described FIG. 3. The signals $r_1(t), r_2(t) \ldots r_q(t)$ produced by sense amplifiers 21-1,2 . . . q, respectively, are digitized and applied to a first input of each of multipliers 32-1,2 . . . q, respectively. An S(t) signal, and preferably also an $S^{90°}(t)$ signal as shown in subsequently described FIG. 5, multiplied by the corresponding 1 or −1 element of the appropriate WHT code or sequence in WHT code matrix 18 in FIG. 4, is applied to second inputs of multipliers 32-1,2 . . . q, respectively. Note that if S(t) is used alone (i.e., without $S^{90°}(t)$), a substantial amount of signal power or signal energy will be lost, but it nevertheless may be practical in some cases to use S(t) alone if the phase that is introduced on the receiver branch is known.

The outputs of multipliers 32-1,2 . . . q in FIGS. 3 and 4 are applied to the inputs of summation circuits or integrators 37-1,2 . . . q, respectively. Summation circuits 37-1,2 . . . q perform accumulation or integration of the "correlated" multiplier output signals over time intervals T1, T2, . . . T4 in FIG. 3. The S(t) inputs to multipliers 32-1,2 . . . q may be in digital form, and are always in phase with the digitized $r_1(t)$, $r_2(t) \ldots r_q(t)$ signals at the sense amplifier outputs, so that properly correlated inputs are applied to summation circuits 37-1,2 . . . q and are continuously integrated over an appropriate single discrete time interval T, which in this example will be T1, T2, T3 or T4. The various S(t) inputs to multipliers 32-1,2 . . . q may have real magnitude values that may be between 0 and 1.0.

In FIG. 4, receiver circuitry 50 includes receiver circuitry channels or "branches" 39-1,2 . . . q which correspond to column conductors 5-1,2 . . . q, respectively. Receiver branch 39-1 includes sense amplifier 29-1, ADC 31-1, multiplier 32-1, accumulator 37-1, switch 44-1, and conductor 38-1. Similarly, receiver branch 39-2 includes sense amplifier 29-2, ADC 31-2, multiplier 32-2, accumulator 37-2, switch 44-2, and conductor 38-2. Receiver branch 39-q includes sense amplifier 29-q, ADC 31-q, multiplier 32-q, accumulator 37-q, switch 44-q, and conductor 38-q.

The summation circuit outputs are sampled by each of switches 44-1,2 . . . q, respectively, and transmitted onto conductors 38-1,2 . . . q, respectively, in accordance with the expression nT, {n=0, 1, . . . \inf}. The sampled values are indicated by the expressions $\{x_1^1, x_1^2, \ldots x_1^n\}$, $\{x_2^1, x_2^2, \ldots x_2^n\}$, . . . , $\{x_q^1, x_q^2, \ldots x_q^n\}$, respectively. In FIG. 4, "nT, {n=0, 1, . . . \inf}" means that switches 44-1,2 . . . q are closed long enough to accurately to sample the outputs of summing circuits or integrators 37-1,2 . . . q, respectively, at every time interval nT, where n is an integer, starting with 0. That is, switches 44-1,2 . . . q close at times T, 2T, 3T . . . , and so on. In the sampled result $\{x_1^1, x_1^2, \ldots x_1^n\}$, "x" represents the sampled output of one of summing circuits 37-1,2 . . . q; the subscripts indicate the associated column grid conductor number, and the superscripts indicate the time intervals, i.e., i=T, 2T, 3T, . . . nT. Thus, the individual terms $x_i^1, x_i^2, \ldots x_i^n$ each represent superpositions of all of the various excitation signals $S_1(t), S_2(t) \ldots S_n(t)$ onto the "i"th column conductor during each of the time intervals 1,2 . . . n, respectively.

WHT-based logic 35 receives the sampled signals $\{x_1^1, x_1^2, \ldots x_1^n\}$, $\{x_2^1, x_2^2, \ldots x_2^n\}$, . . . , $\{x_q^1, x_q^2, \ldots x_q^n\}$ transmitted by switches 44-1,2 . . . q onto conductors 38-1,2 . . . q, respectively, and accordingly determines the amount of the contribution of each of the excitation signals $S_1(t), S_2(t) \ldots S_n(t)$ applied to row conductors 7-1,2 . . . n due to capacitive coupling from that row conductor to each column conductor 5-1,2 . . . q and to each of the other row conductors. That determination is accomplished by correlating the branch output signals on conductors 38-1,2 . . . q conducting the Walsh-Hadamard sequence $\{x_i^1, x_i^2, \ldots x_i^n\}$ with all of the Walsh-Hadamard sequences. If there is no significant cross coupling with a particular row conductor 7-i, then a "1" indicating a significant correlation only with itself will be generated by WHT-based logic 35 for that particular row conductor, and "0"s will be generated for all of the other un-correlated row conductors.

The relatively long amount of time that is available for capture of the information that is integrated (i.e., integrated by means of summing circuits 37-1,2 ... q) and sampled (by means of switches 44-1,2 ... q) and processed in WHT-based logic 35 is central to achieving improved SNR (signal to noise ratio) in the touch screen systems of the present invention. This is because the subsequently described adding and subtracting of the captured signals received on conductors 38-1,2 ... q of receiver circuitry branches 39-1,2 ... q over the 4 time intervals T1, T2, T3, and T4, respectively, in WHT-based logic 35 produces increased amounts of signal energy or information to be used for computing the location of touch 10 on touch screen 1. The increased amount of signal energy/information results in improved accuracy, compared to that of the prior art round robin scanning technique.

A mathematical model of the circuitry in WHT-based logic 35 in FIG. 4 includes an inverse Walsh-Hadamard transform (IWHT) which is applied to each of the sequences $\{x_i^1, x_i^2, \ldots, x_i^L\}$ produced by summer/integrators 37-1,2 ... q. In each of these sequences, "i" is equal to the number 1-2 ... q of that sense amplifier "branch". A Walsh-Hadamard code "j" (referred to as a "WH code j") is $\{c_j^1, c_j^2, \ldots, c_j^L\}$, and the "inverse WHT" (i.e., IWHT) of the sensor branch "i" with respect to the WH code "j" is given by the expression $$\sum_{l=1}^{L} c_j^l x_i^l; j = 1, 2, \ldots, N,\qquad \text{Equation 2}$$

where "L" is the length of Walsh-Hadamard code used. The foregoing summation represents the algebraic summing performed by WHT-based logic 35.

The above IWHT for all WH sequences "j" for each receiver branch "i" can be calculated by means of an efficient Hadamard transform presently disclosed at the website
http://en.wikipedia.org/wiki/Hadamard_transform,
a copy of which is submitted with this application.
The output of each Walsh Hadamard Transform for each sense branch "i" is a separate row of an q×N WHT matrix (where q is the number of column sensor branches and N is the number of driver rows), which is denoted by $$\begin{vmatrix} \alpha^{i1} & \alpha^{i2} & \alpha^{i(N-1)} & \alpha^{iN} \\ \alpha^{21} & \alpha^{22} & \alpha^{2(N-1)} & \alpha^{2N} \\ & & & \\ \alpha^{q1} & & & \alpha^{qn} \end{vmatrix}.\qquad \text{Matrix 1}$$

The mutual coupling capacitances can be estimated at the off-diagonal elements or cross-coupling coefficients in the above matrix.

WHT-based logic 35 may include an implementation of an inverse Walsh Hadamard Transform performed on each of the sampled signals $\{x_i^1, x_i^2, \ldots, x_i^L\}$, where "i" indicates the touch sensor column conductor, and hence also indicates the branch 39-1,2 ... q of receiver circuit 50. The Walsh-Hadamard code consists of various elements that are equal to 1 or −1. The subscript j designates a Walsh Hadamard code for a particular row 7-1,2 ... n, and the superscript 1 refers to the time interval T1, T2, ... TL, where L is the length of the Walsh Hadamard code. In this example, for the first row {1111}, j is equal to 1. For the second row {1-11-1}, j is equal to 2, and so on. WHT code matrix 18 shows the correlations of a particular row j with all of the other rows. Each row conductor 7-1,2 ... n is correlated with all of the Walsh-Hadamard codes. The Walsh-Hadamard transform accomplishes this correlation efficiently. Each $c_j^1$ term of the inverse WHT may have a value of either a 1 or a −1. The value of each $x_i^1$ term depends upon how much capacitive coupling actually exists for the present row conductor. If there is no such capacitive coupling, the corresponding $x_i^1$ terms would have values of all 1s, or a particular $x_i^1$ term would have a value of 1 minus 1, i.e., 0, because it would be the original code. If there is no cross coupling, the $x_i^1$ term would be exactly equal to the $c_j^1$ term. More typically, the $x_i^1$ term could be a real number, e.g., 0.3, 0.4 or the like.

One preferred embodiment of the present invention generates orthogonal waveforms from WHT matrix 18 in FIG. 4 and uses the orthogonal WHT codes in matrix 18 waveforms to generate row excitation signals $S_1(t), S_2(t) \ldots S_n(t)$ and column scanning signals S(t). For example, the Walsh-Hadamard code $\{1,1,-1,-1\}$ is orthogonal. The "1" elements in matrix 18 in FIG. 4 correspond to sections of the $r_1(t), r_2(t) \ldots r_q(t)$ waveforms that are in phase with the basic fixed-frequency sinusoidal carrier signal from which the bursts during the various time intervals T are generated.

The inverse Walsh-Hadamard transform is utilized to express the equation for each receiver channel or branch 39-1,2 ... q in FIG. 4 in the form of above mentioned Matrix 1, which may be referred to as a "coupling coefficient matrix". The diagonal elements or terms of coupling coefficient Matrix 1 indicate the row 7-1,2 ... n on which a certain WHT code or sequence was transmitted and the correlation of that WHT code or sequence with itself in a branch of the receiver circuitry. (The phrase "correlation of that Walsh code with itself" refers to determining how much contribution is there from, e.g., the second row to the second column, from the third row to the third column, etc.) The non-diagonal elements of the coupling coefficient matrix, i.e., the cross terms, indicate the cross coupling between row conductors 7-1,2 ... n and column conductors 5-1,2 ... q. If there is no cross coupling between the row conductors and column conductors, then only the diagonal elements are "1"s or are non-zero and all of the non-diagonal (i.e., cross-coupling) terms are "0"s. The non-diagonal or off-diagonal terms are coefficients that represent the values of the various capacitively cross-coupled signals. (The diagonal terms may have magnitudes less than 1 because the orthogonal excitation signals injected into one end of a row conductor might be somewhat attenuated by the time they reach the other end.)

Next, a simplified example of the operation of touch screen system 11-2 in FIG. 4 will be explained, for the case wherein a finger touch is present on that system 1 in close proximity to row conductor 7-1 and column conductor 5-2, as indicated by dashed line 10.

Sense amplifier output signal $r_1(t)$ will include a capacitively coupled and amplified component of excitation signal $S_1(t)$ and also may include significant capacitively coupled and amplified components of excitation signals $S_2(t), S_3(t)$, and $S_4(t)$, all simultaneously superimposed by capacitive coupling onto column conductor 5-1 and then amplified. Similarly, sense amplifier output $r_2(t)$ will include a capacitively coupled and amplified component of $S_1(t)$ and may also include significant capacitively coupled and amplified components of excitation signals $S_2(t), S_3(t)$, and $S_4(t)$, all simultaneously superimposed by capacitive coupling onto column conductor 5-2 and amplified. The foregoing explanation is similarly applicable to sense amplifier outputs $r_3(t)$ and $r_4(t)$.

In this example, sense amplifier output $r_2(t)$ will include a relatively large capacitively coupled and amplified component due to $S_1(t)$ that is partly caused by the presence of finger touch 10 as shown in FIG. 4. Also, there may be relatively small capacitively coupled and amplified components due to $S_2(t)$, $S_3(t)$, and $S_4(t)$ and touch-influenced cross-coupling capacitances between the various other row and column conductors.

Figure 5:
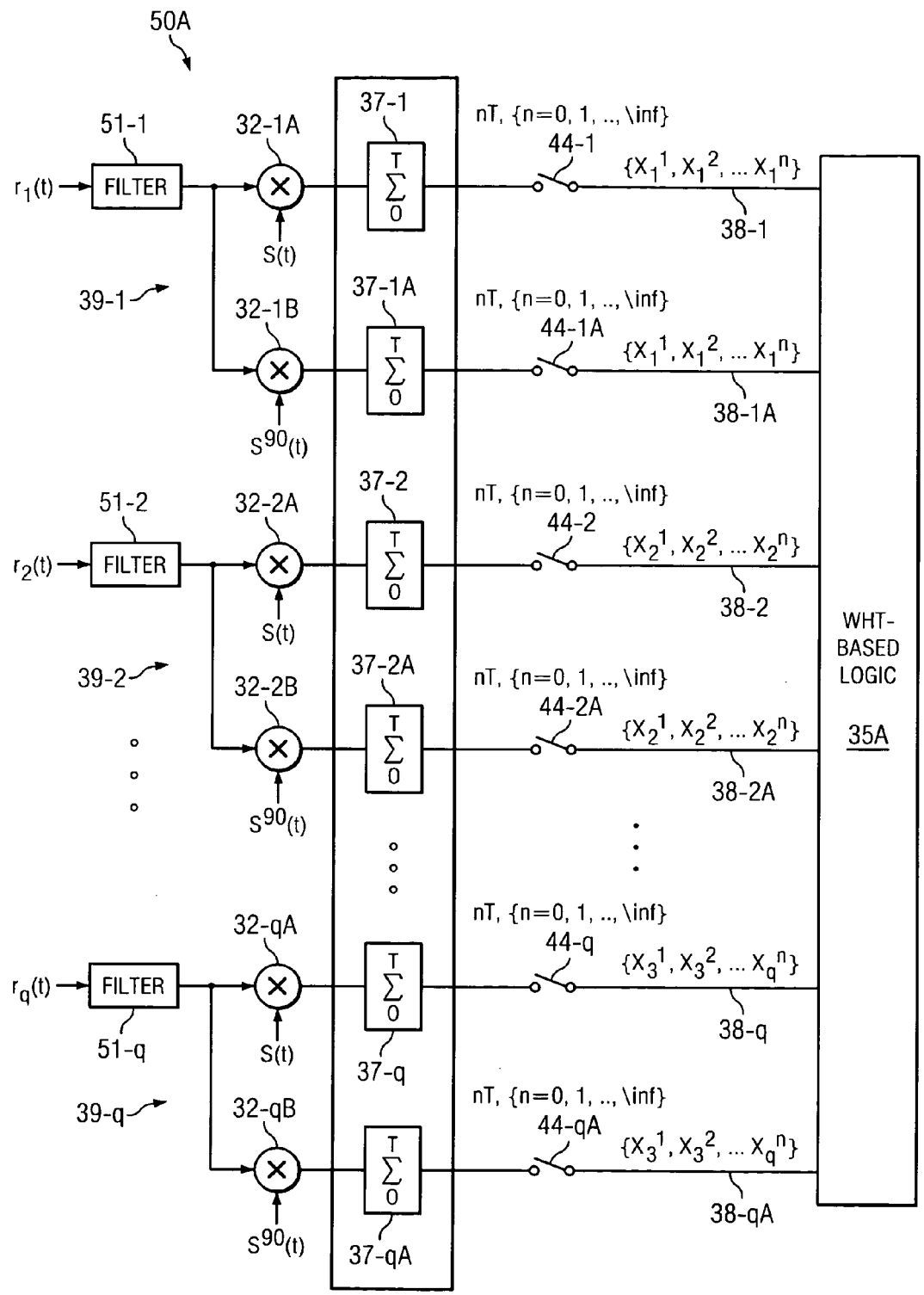
FIG. 5 is a schematic diagram of a preferred embodiment of the invention.

FIG. 5 shows a preferred configuration 50A of receiver circuitry 50 in FIG. 4. Referring to FIG. 5, the signals $r_1(t)$, $r_2(t) \ldots r_q(t)$ may be the analog outputs produced by sense amplifiers 21-1,2 . . . q or digital representations thereof produced by ADCs 31-1,2 . . . q in FIG. 4. In any case, the signals represented by $r_1(t), r_2(t) \ldots r_q(t)$ may be filtered by means of filters 5-1,2 . . . q. These filters can bandpass signals around the spectral content of the signals $S_1(t), S_2(t)$, etc. The filters will let the signal pass through while removing the out-of-band noise. The outputs of filters 51-1,2 . . . q are coupled to a first input of each of multipliers 32-1,2 . . . q, respectively. As in FIG. 4, a second input of each of multipliers 32-1A,2A . . . qA in FIG. 5 are coupled to orthogonal correlation signal S(t), and the outputs of multipliers 32-1A, 2A . . . qA are coupled to inputs of summing circuits 37-1,2 . . . q, respectively. The outputs of summing circuits 37-1,2 . . . q are coupled to various inputs of WHT-based logic 35A by switches 44-1,2 . . . q and conductors 38-1,2 . . . q, respectively.

In FIG. 5, the outputs of filters 51-1,2 . . . q are also coupled to a first input of each of multipliers 32-1B,2B . . . qB, respectively. A second input of each of multipliers 32-1B, 2B . . . qB is coupled to orthogonal correlation signal $S^{90°}(t)$, and the outputs of multipliers 32-1B,2B . . . qB are coupled to inputs of summing circuits 37-1A,2A . . . qA, respectively. Correlation signal $S^{90°}(t)$ is equal to S(t) but is shifted by 90°. The outputs of summing circuits 37-1A,2A . . . qA are coupled to various additional inputs of WHT-based logic 35A by switches 44-1A,2A . . . qA and conductors 38-1A,2A . . . qA, respectively. WHT-based logic 35A in FIG. 5 is basically similar to WHT-based logic 35 in FIG. 4, but is capable of also processing the signals generated by multipliers 32-1A, 2A . . . qA and integrated by summing circuits 37-1A,2A . . . qA.

The orthogonal multiplier or correlator signal S(t), and preferably also orthogonal multiplier or correlator signal $S^{90°}(t)$ as indicated in FIG. 5, are utilized to perform correlations by multiplying each of $r_1(t), r_2(t) \ldots r_q(t)$ by S(t) or both S(t) and $S^{90°}(t)$ in accordance with Walsh-Hadamard code matrix 18 over a time interval T, i.e., first over interval T1, then over interval T2, then interval T3, and then over interval T4. The multiplication/correlation operations provide a way of "looking for" particular signals that are correlated with both S(t) and $S^{90°}(t)$. Correlating with both S(t) and $S^{90°}(t)$ in effect means multiplying the $r_1(t), r_2(t) \ldots r_q(t)$ signals by both sine and cosine signals. This helps avoid errors that may occur as a result of phase offset introduced in the various receiver channels or branches 39-1,2 . . . q.

In receiver branch 39-1, switch 44-1 samples the correlated and integrated output of summing circuit 37-1 at the end of each time interval T, i.e., at the end of each of time intervals T1, T2, T3, and T4. Similarly, in receiver branch 39-2, switch 44-2 samples the correlated and integrated output of summing circuit 37-2 at the end of each time interval T, i.e., at the end of each of time intervals T1, T2, T3, and T4. The same is true for the remaining receiver branches. Similarly, switch 44-1A samples the correlated and integrated output of summing circuit 37-1A at the end of each time interval T, i.e., at the end of each of time intervals T1, T2, T3, and T4. In receiver branch 39-2, switch 44-2A samples the correlated and integrated output of summing circuit 37-2A at the end of each time interval T, i.e., at the end of each of time intervals T1, T2, T3, and T4. The same is true for the remaining receiver branches.

For each of receiver branches 39-1,2 . . . q in FIGS. 4 and 5, what is actually sampled at the end of each of time intervals T1, T2, T3, and T4 is a superposition of capacitively coupled components of excitation signals $S_1(t), S_2(t) \ldots S_q(t)$ onto column conductors 7-1,2 . . . q, respectively, resulting in signals which are amplified to produce the signals $r_1(t), r_2(t) \ldots r_q(t)$. Therefore, each of sense amplifier output signals $r_1(t), r_2(t) \ldots r_q(t)$ at the end of each of time intervals T1, T2, T3, and T4 includes a different combination of superimposed signal components representing all possible capacitive signal coupling and all possible capacitive signal cross-coupling between all of the row conductors and all of the column conductors of touch screen 1. The various superimposed signal components have varying values or weights, depending on the location and characteristics of finger touch 10.

In the present examples, at the end of the first interval T1, the value of sense amplifier output signal $r_1(t)$, after being multiplied by S(t) or both S(t) and $S^{90°}(t)$, will be the sum of 4 such capacitively coupled weights corresponding to the amount of capacitive cross coupling between row conductors 7-1,2 . . . n and column conductor 5-1. Similarly, the value of sense amplifier output signal $r_2(t)$, after being multiplied by S(t) or both S(t) and $S^{90°}(t)$, will be the sum of 4 such capacitively coupled weights corresponding to the amount of capacitive cross coupling between row conductors 7-1,2 . . . n and column conductor 5-2, and similarly for $r_3(t)$ and $r_4(t)$. Similarly, at the end of the second interval T2, the value of sense amplifier output signal $r_1(t)$, after being multiplied by S(t) or both S(t) and $S^{90°}(t)$ and associated sign (FIG. 4), or after being multiplied by both $S^{90°}(t)$ as in FIG. 5, will be the algebraic sum of 4 such capacitively coupled weights corresponding to the amount of capacitive cross coupling between row conductors 7-1,2 . . . n and column conductor 5-1. Similarly, the values of sense amplifier output signal $r_2(t)$, after being multiplied by S(t) or both S(t) and $S^{90°}(t)$ and associated sign, will be the sum of 4 such capacitively coupled weights corresponding to the amount of capacitive cross coupling between row conductors 7-1,2 . . . n and column conductor 5-2, and similarly for $r_3(t)$ and $r_4(t)$. The value of the sense amplifier outputs $r_1(t), r_2(t) \ldots r_q(t)$ at the end of the second interval T2 each will be the algebraic sum of n=4 weights which have various magnitudes and various algebraic signs. The same thing is true at the ends of time intervals T3 and T4. The various weights will depend on the characteristics and location of the finger touch.

WHT-based logic 35 (or WHT-based logic 35A in FIG. 5) separately executes the inverse Walsh-Hadamard transform (IWHT) of above mentioned Equation 2 on each of the sequences sampled by switches 44-1,2 . . . q (and in the embodiment of FIG. 5, also each of the sequences sampled by switches 44-1A,2A . . . qA) to determine above mentioned coupling coefficient Matrix 1. Coupling coefficient Matrix 1 indicates the amounts of the various capacitively coupled contributions from each of row conductors 7-1,2 . . . q to each of column conductors 5-1,2 . . . q. The IWHT exploits the fact that the 4 signals are orthogonal to each other and generate the correlation coefficients shown in above described coupling coefficient Matrix 1.

Each row of coupling coefficient Matrix 1 is the output of the inverse Walsh-Hadamard transform for the corresponding branch 39-1,2 . . . q of receiver circuitry 50. For example, from branch 39-2 in the example of FIG. 4, four numbers $\{x_2^1, x_2^2, \ldots x_2^n\}$, where n=4, are input to WHT-based logic 35, corresponding to the 4 time intervals T1, T2, T3 and T4. From those 4 numbers, WHT-based logic 35 determines the amount of contribution of the capacitive coupling of each of row conductors 7-1,2,3,4 to column conductor 5-2 and hence to $r_2(t)$. WHT-based logic 35 obtains the component of $r_2(t)$ due to excitation signal $S_1(t)$ by correlating the 4 numbers $\{x_2^1, x_2^2, \ldots x_2^n\}$, where n=4, with the top row $\{1111\}$ of matrix 18 in FIG. 4 and adding them accordingly. None of the 4 values will cancel because all are positive during time intervals T1, T2, T3 and T4, as can be readily seen from the timing diagram in FIG. 4. However, for the component of $r_2(t)$ due to excitation signal $S_2(t)$, algebraically adding the 4 numbers after correlating them with the second row $\{1-11-1\}$ of matrix 18 in FIG. 4 results in substantial cancellations. Substantially the same thing is true for components of $r_2(t)$ due to $S_3(t)$ and components due to $S_4(t)$.

In contrast to the previously described prior art round robin technique for exciting the grid conductors of a capacitive touch screen, and in accordance with the present invention, all of the branches 39-1,2 ... q the receiver circuitry 50 receives touch-influenced capacitively coupled information simultaneously and continuously. Consequently, WHT-based logic 35 continually receives contributions of information from all of the receiver circuitry branches all of the time, and therefore receives much more information on the basis of which to accurately determine the row and column of the touch location 10. That enables more accurate determinations of the location of the finger touch 10 on touch screen 1. Use of the orthogonal excitation signals $S_1(t)$, $S_2(t)$ ... $S_n(t)$ and orthogonal correlation signals S(t) or both S(t) and $S^{90°}(t)$ in accordance with the present invention also allows calculation of all cross coupling coefficients.

The present invention, for example as shown in FIGS. 3-5, can apply all row excitation signals $S_1(t)$, $S_2(t)$ ... $S_n(t)$ and column correlation signals S(t) or both S(t) and $S^{90°}(t)$ continuously and separate the various resulting corresponding signals generated by the sense amplifiers by means of relatively straightforward signal processing techniques. This allows use of much lower amplitude driver signals and consequently results in much lower power consumption. Use of lower voltage driver signals may allow use of low voltage wafer fabrication technology and reduced circuit complexity. It is the use of the orthogonal excitation signals allows the excitation signals to be simultaneously and continuously applied to the entire touch screen during a pre-determined amount of time that is available for exciting the touch screen grid conductors, and avoids the shortcomings of using the previously mentioned sequential "round robin" excitation signal techniques.

The benefits of the above described use of orthogonal excitation signals include fundamentally higher SNR, faster touch screen response, and the ability to operate at lower power/voltage levels. These benefits can be traded off during system design to meet objectives that would not be possible with conventional signaling.

It should be understood that although the above described use of the Walsh-Hadamard transform is an elegant way generate the orthogonal signals, it nevertheless is quite simple to implement. However, and as subsequently explained, there are other kinds of orthogonal signals that could be used and ways of generating them. Note that the WHT could be applied to other kinds of waveforms than the above mentioned fixed frequency sinusoidal waveforms. For example, the WHT could be applied to fixed frequency trapezoidal waveforms or square waveforms to obtain the orthogonal row and column scanning signals. This could simplify the circuitry and conserve power.

Figure 6:
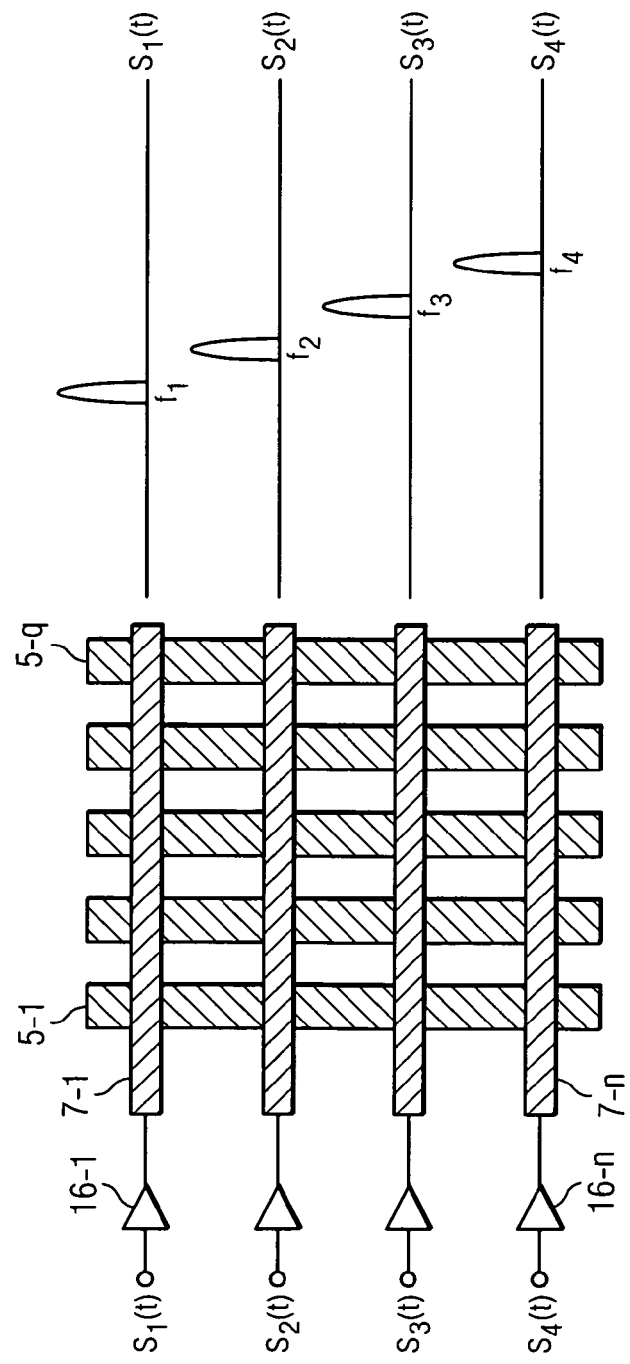
FIG. 6 is a schematic diagram illustrating another implementation of the present invention in which orthogonal wavelets are used as excitation signals.

FIG. 6 shows essentially the same row drivers 16-1,2 ... n, the same capacitive touch screen row grid conductors 7-1,2 ... n, and the same column grid conductors 5-1,2 ... q as FIG. 4. The receiver circuitry 50, including the sense amplifiers, ADCs, multipliers, summation/integrator circuits, switches, and WHT-based logic, also can be essentially the same as shown in FIG. 4. However, a number of different orthogonal signals could be utilized. One technique would be to use signals $S_1(t), S_2(t) \ldots S_n(t)$ and S(t) that are orthogonal in frequency, somewhat similarly to OFDM (orthogonal frequency division multiplexing) systems). However, a drawback to this kind of technique here is that signals of different frequencies would be applied each driver, and the sense amplifiers and receivers would need to handle wide bandwidth, and consequently would be more complex and costly. Either a FFT (fast Fourier transform) or IFFT (impulse fast Fourier transform kind of transform would be needed to achieve the needed correlation across multiple closely-spaced frequencies.

Furthermore, the orthogonal signals $S_1(t), S_2(t) \ldots S_n(t)$ and S(t) in FIG. 6 may include wavelets or other arbitrary waveforms instead of the inverted and non-inverted fixed frequency sinusoidal signals such as the $S_1(t), S_2(t) \ldots S_n(t)$ waveforms shown in FIG. 4. The excitation signals $S_1(t), S_2(t) \ldots S_n(t)$ and S(t) or both S(t) and $S^{90°}(t)$ can be wavelets or other arbitrary waveform, and can have a value of +1 or −1 in accordance with the WHT codes in WHT code matrix 18. Furthermore, there are other near-orthogonal codes, such as Gold codes, Kashmi codes, and Golay codes that could be used instead of Walsh-Hadamard codes.

To avoid the possibility that the excitation signals might be a large source of RFI (radiofrequency interference) which might interfere with other circuitry, the Walsh-Hadamard-orthogonally-modulated signals $S_1(t), S_2(t) \ldots S_n(t)$ are approximately randomly "dampened". This is accomplished by multiplying all of the signals $S_1(t), S_2(t) \ldots S_n(t)$ by a common random waveform. The basic correlations are unaffected because the same common random waveform multiplication (referred to as a "common spreading") is performed in receiver 50 (or 50A), for example, in multipliers 32-1,2 ... q and 32-1A,2A ... qA. The Walsh-Hadamard code, instead of being $\{c_j^1, c_j^2, \ldots c_j^L\}$ as previously described, is further multiplied by a "spreading code" $\{d^1, d^2, d^3, \ldots d^M\}$ to obtain a net modulating code for each of the signals $S_1(t), S_2(t) \ldots S_n(t)$.

Figure 7:
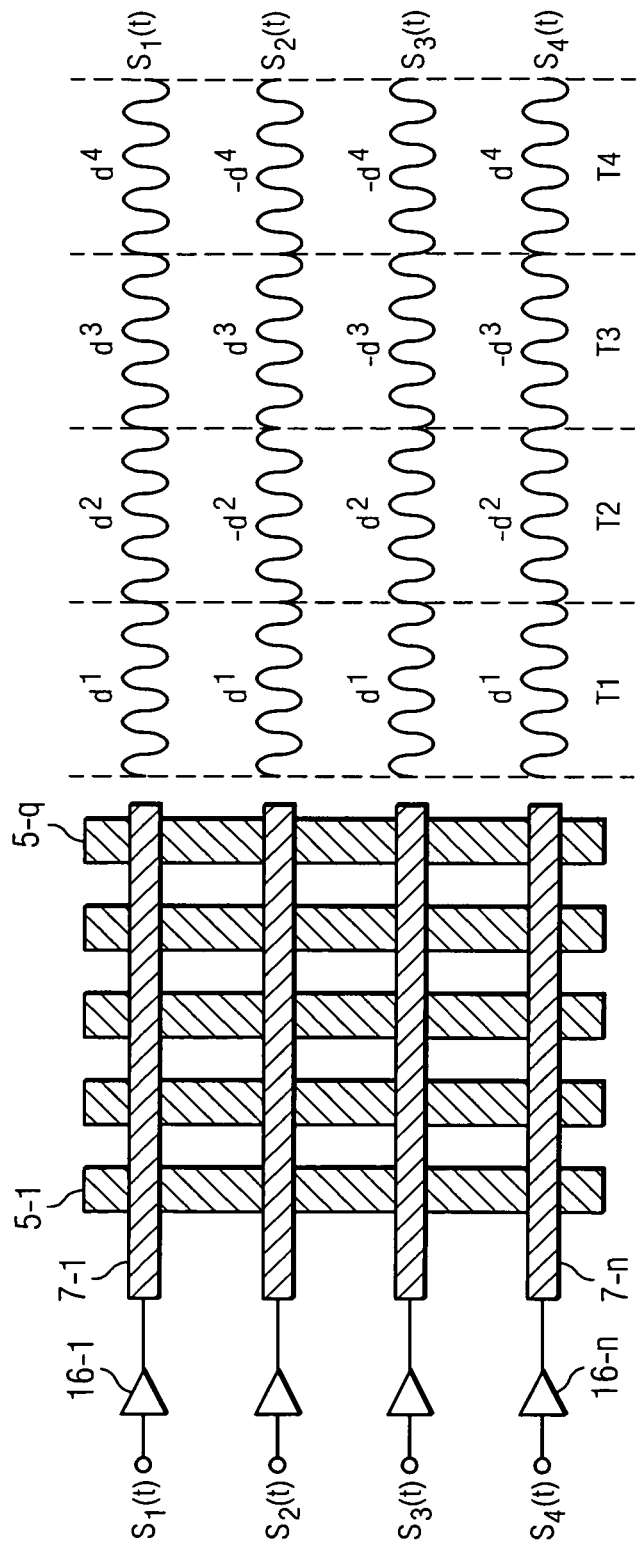
FIG. 7 is a schematic diagram illustrating another implementation of the present invention in which orthogonal excitation signals are multiplied by a common random multiplier.

FIG. 7 shows essentially the same row drivers 16-1,2 ... n, the same capacitive touch screen row grid conductors 7-1,2 ... n, and the same column grid conductors 5-1,2 ... q as FIG. 4. The receiver circuitry 50, including the sense amplifiers, ADCs, multipliers, summation/integrator circuits, switches, and WHT-based logic also can be essentially the same as shown in FIG. 4. The $S_1(t), S_2(t) \ldots S_n(t)$ waveforms in FIG. 7 are the same as in FIG. 4 except that each of the four waveforms $S_1(t), S_2(t) \ldots S_n(t)$ is multiplied by the above common "spreading code" $\{d^1, d^2, d^3, d^4\}$ which is common across all of the q (in this example, q=4) channels. More generally, the spreading code is $\{d^1, d^2, d^3, \ldots d^M\}$ where M>>L, wherein L is the number of time intervals T in a scanning cycle, and wherein $d_i$ is equal to −1 or 1 and is common to all of the orthogonal excitation signals. The net modulating code for channel "j" is $\{d^k c_j^1, d^{k+1} c_j^2, \ldots, d^{k+L} c_j^L\}$. This technique helps in randomizing all the codes and hence prevents possible spectral emissions/spurs and therefore accomplishes "whitening" of the spectral content of the signals on the various row grid conductors driven by the row drivers i.e., accomplishes randomizing of the frequency spectrum on all of the branches of the receiver circuitry 50.

The signals generated by drivers 16-1,2 . . . n and applied to row conductors 7-1,2 . . . n may be influenced by "dispersion", i.e., by "inter-signal interference", which may cause the row conductors signals to extend a bit beyond the ends of the time intervals such as T1, T2, . . . Tq. Above mentioned Equation 1 becomes more complicated if there is such dispersion, because the summation will also include a dispersed or delayed component of $S_1(t)$, which can be thought of as analogous to one of its own "reflections".

Figure 8:
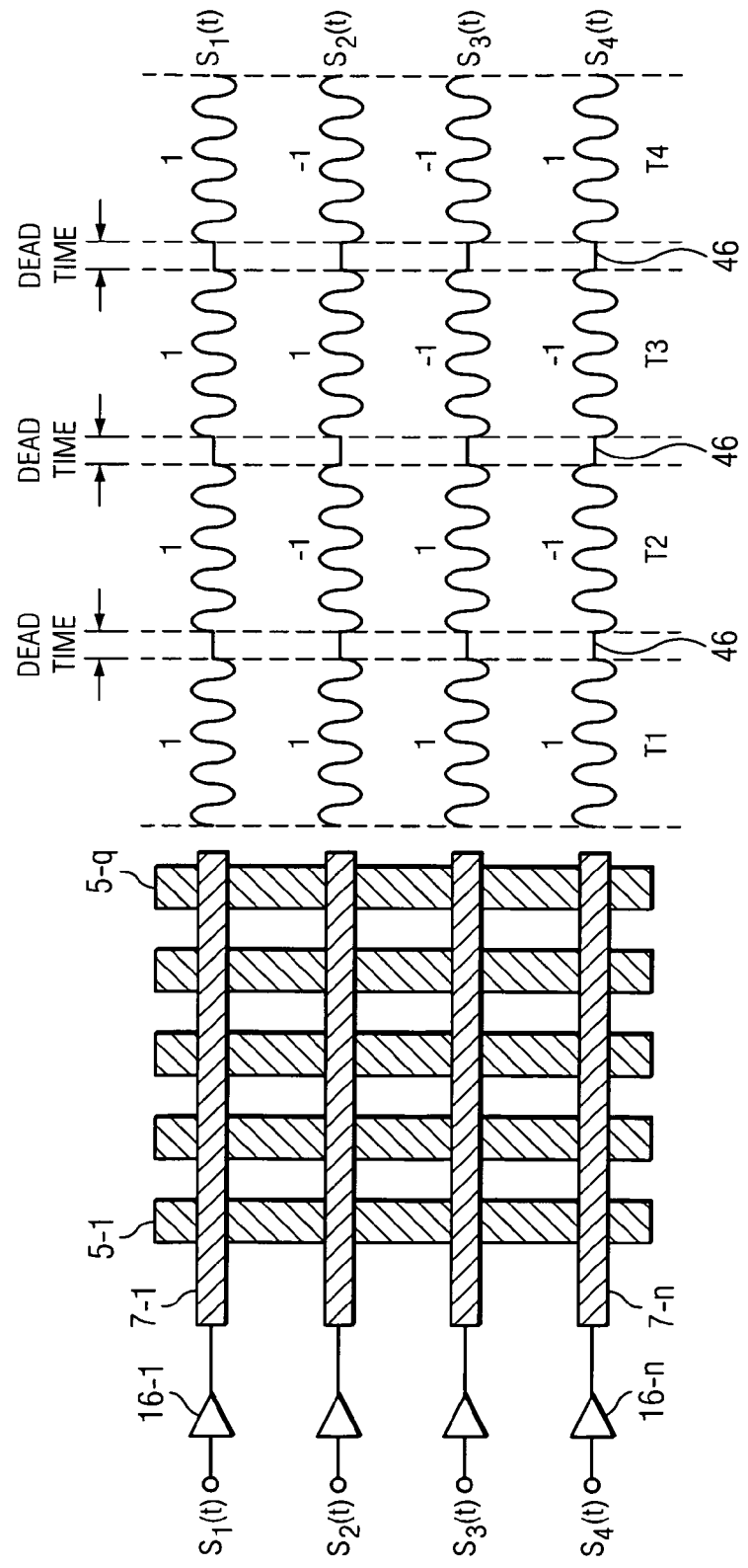
FIG. 8 is a schematic diagram illustrating another implementation of the present invention in which a short dead time is provided between each segment of the orthogonal excitation signals to allow effects of signal dispersion to settle.

FIG. 8 shows essentially the same row drivers 16-1,2 . . . n, the same capacitive touch screen row grid conductors 7-1,2 . . . n, and the same column grid conductors 5-1,2 . . . q as FIG. 4. The receiver circuitry 50, including the sense amplifiers, ADCs, multipliers, summation/integrator circuits, switches, and WHT-based logic also can be essentially the same as shown in FIG. 4. The $S_1(t)$, $S_2(t)$ . . . $S_n(t)$ waveforms shown in FIG. 8 are essentially the same as in FIG. 4 except that each of the four waveforms $S_1(t)$, $S_2(t)$ . . . $S_n(t)$ includes a "dead time" 46 between each of the time intervals T1, T2, . . . Tn, to allow "signal spreading" effects or dispersion effects to settle. In addition to providing the time spreading of signals (which is equivalent to non-flat magnitude/phase variation of the signal path over the circuitry bandwidth range) as described above with reference to FIG. 7, the "dead times" (i.e., no signal transmission) represented by reference numeral 46 may be provided to allow the time spreading of signals to settle. This may allow use of lower complexity, lower complexity receiver circuitry. The use of dead times 46 avoid the effects of such dispersion and avoid problems associated with frequency selectivity/time spreading of signals. The receiver/sensing circuit ignores the dead time transmission.

In some cases it may be practical to use the same orthogonal signal to drive multiple row conductors. For example, there may be significant capacitive coupling from row 1 to adjacent rows 2, 3 and 4 but no significant capacitive coupling beyond that, in which case the same orthogonal signal $S_1(t)$ might be to drive both row 1 and a row 9.

Sometimes, for example if the user of a touch sensor is not doing anything, power may be conserved because then it may be necessary to apply orthogonal drive signals only momentarily. In that case, when a touch is detected the system can switch to a mode in which all excitation signals are transmitted simultaneously. Also, it may be practical to use reduced processing gain and shorter bursts for monitoring the touchscreen and then, once a touch is detected, it may be practical to switch to more sophisticated codes and achieve much better accuracy.

While the invention has been described with reference to several particular embodiments thereof, those skilled in the art will be able to make various modifications to the described embodiments of the invention without departing from its true spirit and scope. It is intended that all elements or steps which are insubstantially different from those recited in the claims but perform substantially the same functions, respectively, in substantially the same way to achieve the same result as what is claimed are within the scope of the invention.

For example, although ADCs 31-1,2 . . . q are shown connected between sense amplifiers 21-1,2 . . . q 21-q and multipliers 32-1,2 . . . q, it may be practical in some cases to perform the multiplications in the analog domain and then convert the resulting analog information to digital information. In fact, the entire function of multiplication by S(t) and $S^{90°}(t)$ could be performed in the analog domain, although that ordinarily would be un-economic in view of readily available fast, low-cost digital technology that provides many advantages. In a more general implementation of the invention, all of the receiver circuitry 50 could be analog circuitry.

The S(t) and $S^{90°}(t)$ inputs to the multipliers 32-1,2 . . . q and 32-1A,2A . . . qA could be analog signals, although the $S_1(t)$, $S_2(t)$ . . . $S_q(t)$ input signal supplied to the row drivers 16-1,2 . . . n always are analog signals.

Furthermore, rather than using WHT-based techniques, the technique of applying other cotemporaneous orthogonal signals than those mentioned previously, such as different frequency cotemporaneous orthogonal excitation signals, to the various row conductors and applying different frequency column correlation inputs to the various branches in the receiver circuitry can be used, wherein each driver transmits a different frequency and the sense amplifiers selectively respond to the different frequencies.

Furthermore, although a "touch point 10" is referred to in the described invention, the invention is intended to encompass detection of the location of a finger tip or other conductive tip located sufficiently close to the touchscreen surface to significantly influence the described capacitive coupling therein.

What is claimed is:

1. A touch screen system comprising:
  (a) a capacitive touch screen including a plurality of row conductors and a column conductor;
  (b) orthogonal drive circuitry coupled to simultaneously drive a plurality of cotemporaneous orthogonal excitation signals onto the row conductors, wherein the cotemporaneous orthogonal excitation signals occur over a plurality of successive time intervals each having a predetermined duration; and
  (c) receiver circuitry including
    (1) a sense amplifier coupled to generate an amplifier output signal in response to signals capacitively coupled onto the column conductor in response to the cotemporaneous orthogonal excitation signals on the row conductors, wherein one or more of the capacitively coupled signals on the column conductor may be influenced by a touch on the capacitive touch screen, and
    (2) logic circuitry for determining amounts of contribution of the cotemporaneous excitation signals to the amplifier output signal due to capacitive coupling from each row conductor, respectively, to the column conductor,
  wherein each of the cotemporaneous orthogonal excitation signals is generated by multiplying a plurality of segments of a carrier signal by a plurality of elements, respectively, of a corresponding Walsh-Hadamard sequence,
  wherein the capacitive touch screen includes a plurality of the column conductors and a plurality of the sense amplifiers each coupled to generate a corresponding amplifier output signal in response to signals capacitively coupled onto the plurality of column conductors in response to the cotemporaneous orthogonal excitation signals on the row conductors, wherein one or more of the capacitively coupled signals on the plurality of column conductors may be influenced by the touch on the capacitive touch screen, wherein the receiver circuitry includes
  a plurality of multiplier circuits for correlating the amplifier output signals by multiplying them by cotemporaneous orthogonal correlation signals,
  a plurality of summation circuits for accumulating correlated signal information from the multiplier circuits, respectively, over time intervals equal to the predetermined duration, and a plurality of sampling circuits for sampling outputs of the summation circuits, respectively, at ends of the successive time intervals, and wherein the logic circuitry determines amounts of signal contribution of the cotemporaneous excitation signals capacitively coupled from each row conductor, respectively, to each of the plurality of column conductors.

2. The touch screen system of claim 1 wherein each of the amplifier output signals is multiplied by a first cotemporaneous orthogonal correlation signal and then is input to a corresponding first summation circuit and is also multiplied by a second cotemporaneous orthogonal correlation signal and then is input to a corresponding second summation circuit.

3. The touch screen system of claim 2 wherein the second cotemporaneous orthogonal correlation signal is shifted 90° in phase relative to the first cotemporaneous orthogonal correlation signal.

4. The touch screen system of claim 1 wherein the receiver circuitry includes a plurality of analog to digital converters (ADCs) coupled between the sense amplifiers and the multiplier circuits for converting the amplifier output signals to digital representations thereof.

5. The touch screen system of claim 1 wherein the plurality of sampling circuits include a plurality of switches, respectively, coupled between outputs of the summation circuits and inputs of the logic circuitry.

6. The touch screen system of claim 5 wherein each of the plurality of switches is controlled to generate information samples sampled at the ends of the successive time intervals.

7. The touch screen system of claim 6 wherein the logic circuitry includes Walsh-Hadamard Transform based logic circuitry which executes an inverse Walsh-Hadamard Transform on the information samples sampled at the ends of the successive time intervals to generate a coupling coefficient matrix.

8. The touch screen system of claim 7 wherein the coupling coefficient matrix represents the equations $$r_i(t) = \sum_{j=1}^{N} \alpha^{ij} S_j(t); i = 1, 2, \ldots q,$$

where $a^{ij}$ denote the cross-coupling coefficients from a row j to a column i, $S_j(t)$ represents the cotemporaneous orthogonal excitation signals on the row j, $r_i(t)$ represents the amplifier output signal for the column i, and N represents a number of rows.

9. The touch screen system of claim 8 wherein the inverse Walsh-Hadamard Transform corresponding to a column i with respect to a sequence of the information samples included in a Walch Hadamard code corresponding to a row j is given by the expression $$\sum_{l=1}^{L} c_j^l x_i^l; j = 1, 2, \ldots, N,$$

wherein $c_j^l$ is an element of the Walsh-Hadamard code for the row j, and L is the length of the Walsh-Hadamard code, and wherein the coupling coefficient matrix is represented by $$\begin{vmatrix} \alpha^{i1} & \alpha^{i2} & \alpha^{i(N-1)} & \alpha^{iN} \\ \alpha^{21} & \alpha^{22} & \alpha^{2(N-1)} & \alpha^{2N} \\ & & & \\ \alpha^{q1} & & & \alpha^{qn} \end{vmatrix}.$$

10. The touch screen system of claim 1 wherein the carrier signal is sinusoidal.

11. The touch screen system of claim 1 wherein the cotemporaneous orthogonal excitation signals are wavelets.

12. The touch screen system of claim 1 wherein each of the cotemporaneous orthogonal excitation signals is multiplied by a common randomized spreading code to avoid radio frequency interference.

13. The touch screen system of claim 1 wherein each of the cotemporaneous orthogonal excitation signals includes a relatively short dead time at the end of each of the segments to allow effects of excitation signal dispersion to settle.

14. A method for operating a touch screen system including
a capacitive touch screen including a plurality of row conductors and a column conductor, and
receiver circuitry including a sense amplifier coupled to generate an amplifier output signal in response to signals capacitively coupled onto the column conductor,
the method comprising:
(a) simultaneously driving a plurality of cotemporaneous orthogonal excitation signals onto the row conductors, respectively, wherein one or more of the capacitively coupled signals on the column conductor may be influenced by a touch on the capacitive touch screen, and wherein the cotemporaneous orthogonal excitation signals occur over a common plurality of successive time intervals, each of the successive time intervals having a predetermined duration; and
(b) determining amounts of contribution by each of the cotemporaneous excitation signals to the amplifier output signal due to capacitive coupling from each row conductor, respectively, to the column conductor,
wherein each of the cotemporaneous orthogonal excitation signals is generated by multiplying a plurality of segments of a carrier signal by a plurality of elements, respectively, of a corresponding Walsh-Hadamard sequence, and wherein the receiver circuitry receives a plurality of the column conductors and includes a plurality of the sense amplifiers each coupled to generate a corresponding amplifier output signal in response to signals capacitively coupled onto the plurality of column conductors, respectively, in response to the cotemporaneous orthogonal excitation signals,
wherein the method includes
correlating the amplifier output signals by multiplying them by a first cotemporaneous orthogonal correlation signal,
accumulating the correlated amplifier output signals, respectively, over a time interval equal to the predetermined duration, and
sampling the correlated and then accumulated amplifier output signals at ends of the successive time intervals.

15. The method of claim 13 wherein step (b) includes executing an inverse Walsh-Hadamard Transform on information samples of the correlated and accumulated and then sampled amplifier output signals to generate information representative of a coupling coefficient matrix.

16. The method of claim 13 wherein the correlating includes also multiplying the amplifier output signals by a second cotemporaneous orthogonal correlation signal, wherein the second cotemporaneous orthogonal correlation signal is the same as but shifted in phase relative to the first cotemporaneous orthogonal correlation signal.

17. The method of claim 13 wherein the carrier signal is sinusoidal.

18. A touch screen system comprising:
(a) a capacitive touch screen including a plurality of row conductors and a column conductor;
(b) receiver circuitry including a sense amplifier coupled to generate an amplifier output signal in response to signals capacitively coupled onto the column conductor;
(c) means for simultaneously driving a plurality of cotemporaneous orthogonal excitation signals onto the row conductors, respectively, wherein one or more of the capacitively coupled signals on the column conductor may be influenced by a touch on the capacitive touch screen, and wherein the cotemporaneous orthogonal excitation signals occur over a common plurality of successive time intervals, each of the time intervals having a predetermined duration; and
(d) means for determining amounts of signal contribution by each of the cotemporaneous excitation signals to the amplifier output signal due to capacitive coupling from each row conductor, respectively, to the column conductor,
wherein each of the cotemporaneous orthogonal excitation signals is generated by multiplying a plurality of segments of a carrier signal by a plurality of elements, respectively, of a corresponding Walsh-Hadamard sequence,
wherein the capacitive touch screen includes a plurality of the column conductors and a plurality of the sense amplifiers each coupled to generate a corresponding amplifier output signal in response to signals capacitively coupled onto the plurality of column conductors in response to the cotemporaneous orthogonal excitation signals on the row conductors, wherein one or more of the capacitively coupled signals on the plurality of column conductors may be influenced by the touch on the capacitive touch screen, wherein the receiver circuitry includes a plurality of multiplier circuits for correlating the amplifier output signals by multiplying them by cotemporaneous orthogonal correlation signals, a plurality of summation circuits for accumulating correlated signal information from the multiplier circuits, respectively, over time intervals equal to the predetermined duration, and a plurality of sampling circuits for sampling outputs of the summation circuits, respectively, at ends of the successive time intervals, and wherein the logic circuitry determines amounts of signal contribution of the cotemporaneous excitation signals capacitively coupled from each row conductor, respectively, to each of the plurality of column conductors.

* * * * *